US011914321B1

(12) United States Patent
Yamaguchi

(10) Patent No.: US 11,914,321 B1
(45) Date of Patent: Feb. 27, 2024

(54) IMAGE FORMING APPARATUS WITH SOUND MITIGATION

(71) Applicant: TOSHIBA TEC KABUSHIKI KAISHA, Tokyo (JP)

(72) Inventor: Masao Yamaguchi, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/896,120

(22) Filed: Aug. 26, 2022

(51) Int. Cl.
*G03G 21/16* (2006.01)

(52) U.S. Cl.
CPC ................................ *G03G 21/1619* (2013.01)

(58) Field of Classification Search
CPC .................................................. G03G 21/1619
See application file for complete search history.

(56) References Cited

U.S. PATENT DOCUMENTS 10,875,731 B1 * 12/2020 Kamano ............ G03G 21/1619

FOREIGN PATENT DOCUMENTS

| | | |
|---|---|---|
| JP | 09-281876 | 10/1997 |
| JP | 2003-150026 | 5/2003 |
| JP | 2008-299281 | 12/2008 |

* cited by examiner

*Primary Examiner* — Sandra Brase
(74) *Attorney, Agent, or Firm* — Amin, Turocy & Watson, LLP

(57) ABSTRACT

According to one embodiment, an image forming apparatus includes an image forming unit configured to form an image on paper, a conveying unit configured to convey the paper through the image forming unit, and a housing configured to accommodate the image forming unit and the conveying unit. The conveying unit is arranged on one side surface side of the housing. The housing has an opening on a side wall on a conveying unit side. The opening is open only downward.

18 Claims, 25 Drawing Sheets

L=0.005m

L=0.010m

L=0.015m

Gb/Ga=4

IMAGE FORMING APPARATUS WITH SOUND MITIGATION

FIELD

Embodiments described herein relate generally to an image forming apparatus.

BACKGROUND

An image forming apparatus has a plurality of motors and a plurality of moving parts. For this reason, sound caused by operations of the plurality of motors and the plurality of moving parts leaks from the image forming apparatus.

DETAILED DESCRIPTION

In general, according to one embodiment, an image forming apparatus includes an image forming unit configured to form an image on a paper, a conveying unit configured to convey the paper through the image forming unit, and a housing configured to accommodate the image forming unit and the conveying unit. The conveying unit is arranged on one side surface side of the housing. The housing has an opening on a side wall on a conveying unit side. The opening is open only downward.

Figure 1:
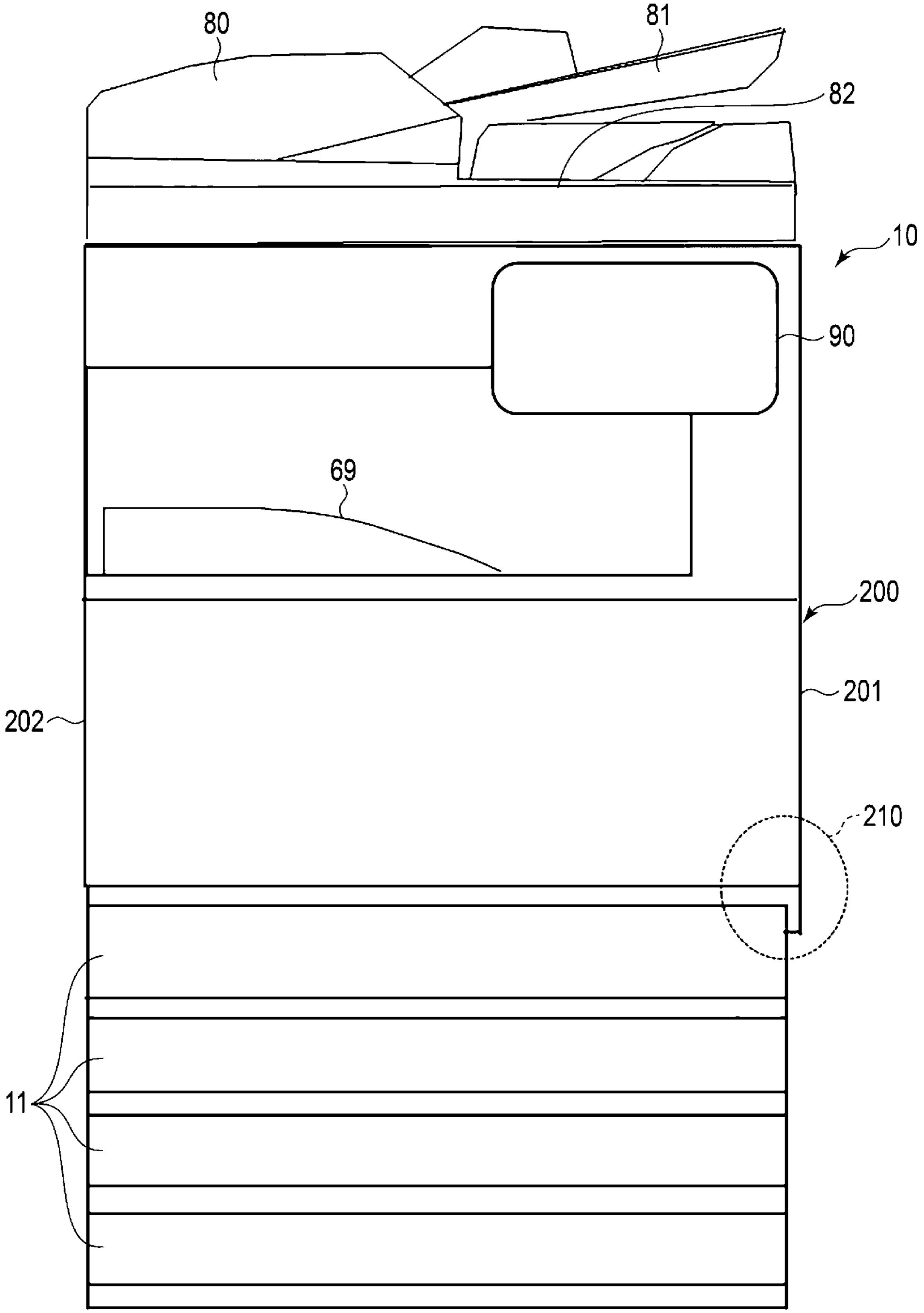
FIG. 1 is a front external view of an image forming apparatus according to an embodiment.
Figure 2:
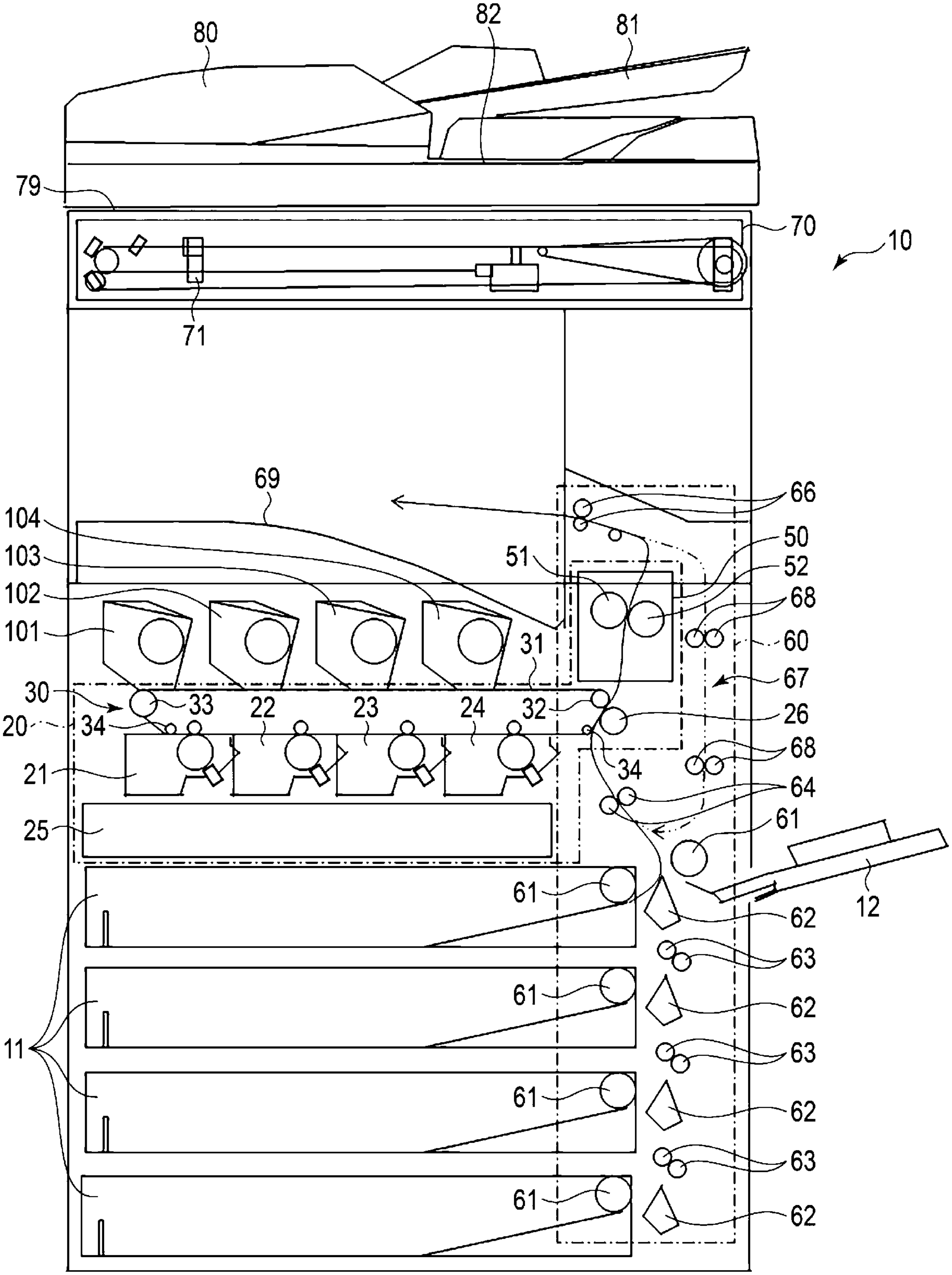
FIG. 2 is a cross-sectional view illustrating an internal structure of a digital complex machine of FIG. 1.

Hereinafter, one embodiment will be described with reference to the drawings. First, the image forming apparatus according to the embodiment will be described with reference to FIGS. 1 and 2. The image forming apparatus is, for example, a digital complex machine arranged in a workplace. FIG. 1 is a front external view of an image forming apparatus 10 according to the embodiment. FIG. 2 is a cross-sectional view illustrating an internal structure of the image forming apparatus 10 of FIG. 1.

The image forming apparatus 10 has a printing function, a scanning function, a copying function, a facsimile function, and the like. The printing function is a function of forming a toner image on paper. The scanning function is a function of reading an image from a document. The copying function is a function of printing the image read from the document by using the scanning function on the paper by using the printing function. The facsimile function is a function of printing an image based on data received by using a communication line on the paper by using the printing function.

As illustrated in FIGS. 1 and 2, the image forming apparatus 10 includes a plurality of paper feed cassettes 11. The paper feed cassette 11 accommodates a plurality of sheets of paper used for printing. Further, as illustrated in FIG. 2, the image forming apparatus 10 includes a manual feed tray 12. The manual feed tray 12 is to manually feed paper in the state where the plurality of sheets of paper are overlapped.

As illustrated in FIGS. 1 and 2, the image forming apparatus 10 includes an image forming unit 20 and a conveying unit 60. The image forming unit 20 forms an image on paper. The conveying unit 60 picks up the paper one sheet by one sheet from one of the plurality of paper feed cassettes 11 or the manual feed tray 12 and conveys the paper through the image forming unit 20.

As illustrated in FIG. 2, the image forming unit 20 includes a plurality of image forming units 21, 22, 23, and 24, an exposure device 25, a transfer belt unit 30, and a secondary transfer roller 26. Further, the image forming unit 20 is loaded with a plurality of toner cartridges 101, 102, 103, and 104 for supplying respective toners to the plurality of image forming units 21, 22, 23, and 24.

The toner cartridges 101, 102, 103, and 104 contain toners of different colors to be supplied to the image forming units 21, 22, 23, and 24, respectively. The leftmost toner cartridge 101 in FIG. 1 contains a toner of a yellow color. The second toner cartridge 102 from the left contains a toner of a magenta color. The third toner cartridge 103 from the left contains a toner of a cyan color. The rightmost toner cartridge 104 contains a toner of a black color. The toner cartridges 101, 102, 103, and 104 have substantially the same configuration except for the difference in toner to be contained.

The image forming units 21, 22, 23, and 24 are supplied with different colored toners from the toner cartridges 101, 102, 103, and 104, respectively, and form different colored toner images. The leftmost image forming unit 21 in FIG. 1 forms the toner image of the yellow (Y) color. The second image forming unit 22 from the left forms the toner image of the magenta (M) color. The third image forming unit 23 from the left forms the toner image of the cyan (C) color. The rightmost image forming unit 24 forms the toner image of the black (K) color. The image forming units 21, 22, 23, and 24 have substantially the same configuration except for the difference in toner.

The exposure device 25 irradiates surfaces of photoconductor drums of the image forming units 21, 22, 23, and 24 with light beams for forming the yellow, magenta, cyan, or black images according to the image data of the respective colors of the color-separated yellow, magenta, cyan, and black colors. The exposure device 25 controls the light beam according to the Y, M, C, and K components of the image data to form electrostatic latent images for the yellow, magenta, cyan, and black on the surfaces of the photoconductor drums of the image forming units 21, 22, 23, and 24, respectively.

The image forming units 21, 22, 23, and 24 develop the electrostatic latent images on the surfaces of the photoconductor drums with yellow, magenta, cyan, and black toners, respectively, to form yellow, magenta, cyan, and black toner images.

The transfer belt unit 30 includes an endless transfer belt 31 and two rollers around which the transfer belt 31 is wound and stretched. These two rollers are a drive roller 32 and a driven roller 33. In addition to this, the transfer belt unit 30 includes a tension roller 34 configured to apply tension to the transfer belt 31. By rotating the drive roller 32, the transfer belt 31 can circulate in both forward and reverse directions.

During the image formation, the transfer belt 31 circulates in the counterclockwise direction. For example, in color image formation, first, the image forming unit 21 transfers (primarily transfers) the yellow toner image to the transfer belt 31. The transfer belt 31 circulates in the counterclockwise direction to sequentially convey the yellow toner image to the image forming units 22, 23, and 24. Next, the image forming units 22, 23, and 24 sequentially transfer (primarily transfer) the magenta, cyan, and black toner images to the transfer belt 31 so that the respective toner images are overlapped on the yellow toner image.

In this manner, the image forming units 21, 22, 23, and 24 cooperate with the transfer belt unit 30 to form the color toner image on the surface of the transfer belt 31. After that, furthermore, the transfer belt 31 circulates in the counterclockwise direction to convey the color toner image to the secondary transfer roller 26.

The secondary transfer roller 26 faces the surface of the drive roller 32 with the transfer belt 31 interposed therebetween and generates the transfer voltage between the secondary transfer roller 26 and the drive roller 32. The secondary transfer roller 26 transfers (secondarily transfers) the color toner image on the surface of the transfer belt 31 to the paper conveyed between the transfer belt 31 and the secondary transfer roller 26 by the transfer voltage.

Furthermore, the image forming unit 20 includes a fixing device 50. The fixing device 50 heats and pressurizes the paper on which the color toner image is transferred. The fixing device 50 includes a heating roller 51 and a pressurizing roller 52 facing each other with the paper conveying path interposed therebetween. The heating roller 51 includes a heat source for heating the heating roller 51. The heat source is, for example, a heater. The heating roller 51 heated by the heat source heats the paper to a melting temperature of the toner. Further, the pressurizing roller 52 pressurizes the paper passing between the pressurizing roller 52 and the heating roller 51. The heating by the heating roller 51 and the pressurization by the pressurizing roller 52 fix the color toner image transferred to the paper to the paper and print the image on the paper.

The conveying unit 60 includes a plurality of paper feed rollers 61, a plurality of guides 62, a plurality of conveying rollers 63, 66, and a registration roller 64. Each paper feed roller 61 picks up the paper one sheet by one sheet from one of the plurality of paper feed cassettes 11 or the manual feed tray 12. Each guide 62 guides the paper picked up from the paper feed cassette 11 to the conveying roller 63. The conveying roller 63 conveys the paper to the registration roller 64. The registration roller 64 corrects the skew of the paper and conveys the paper to the image forming unit 20 while measuring the timing. The conveying roller 66 discharges the paper on which the image is printed by the image forming unit 20 to a paper discharge tray 69.

The conveying unit 60 also includes a double-sided printing unit 67 for printing the image on both sides of the paper. The double-sided printing unit 67 includes a conveying roller 68. During the double-sided printing, the conveying roller 66 switches back the paper on which the image is printed on one surface of the paper by the image forming unit 20 and conveys the paper to the double-sided printing unit 67. The conveying roller 68 of the double-sided printing unit 67 cooperates with the conveying roller 66 to convey the paper to the image forming unit 20 with a surface opposite to the surface on which the image is printed toward the transfer belt 31.

The image forming unit 20 prints the image on the surface of the paper opposite to the surface on which the image is printed by the same operation described above. After that, the conveying roller 66 discharges the paper on which the image is printed on both sides to the paper discharge tray 69.

The image forming apparatus 10 further includes a scanner 70. The scanner 70 includes an imaging element 71 that is movable in a horizontal direction and a document glass 79 on which a document is placed. The imaging element 71 reads an image of the document placed on the document glass 79 through the document glass 79 while being moved in the horizontal direction. The scanner 70 reads the image by an optical reduction method using, for example, a charge-coupled device (CCD) image sensor as the imaging element 71. Alternatively, the scanner 70 reads the image by a contact image sensor (CIS) method using a complementary metal-oxide-semiconductor (CMOS) image sensor or the like as the imaging element 71.

The image forming apparatus 10 includes, for example, a document feeder 80. The document feeder 80 is also called, for example, an auto document feeder (ADF). The document feeder 80 is attached to the scanner 70. If the document feeder 80 is used, the imaging element 71 of the scanner 70 is arranged at a predetermined position without being moved. The document feeder 80 conveys the documents placed on the paper feed tray 81 one sheet by one sheet to a paper discharge tray 82 via the document glass 79 located above the imaging element 71. The imaging element 71 of the scanner 70 reads the image of the document passing through the document glass 79 located above the imaging element 71. The image forming apparatus 10 may include a document cover for pressing the document instead of including the document feeder 80.

The image forming apparatus 10 also includes a control panel 90 as illustrated in FIG. 1. The control panel 90 has buttons, a touch panel, and the like for an operator of the image forming apparatus 10 to operate. The touch panel is a stack of a display such as a liquid crystal display or an organic EL display and a pointing device by touch input. Therefore, the buttons and the touch panel function as an input device that accepts the operations by the operator of the image forming apparatus 10. Further, the display included in the touch panel functions as a display device for notifying the operator of the image forming apparatus 10 of various types of information.

As illustrated in FIG. 1, the image forming apparatus 10 includes a housing 200 that accommodates the paper feed cassette 11, the manual feed tray 12, the image forming unit 20, the conveying unit 60, and the scanner 70. The conveying unit 60 is arranged on one side surface side of the housing 200. In the embodiment, as illustrated in FIGS. 1 and 2, the conveying unit 60 is arranged on the right side of the housing 200. Hereinafter, for convenience, the side surface side on which the conveying unit 60 is arranged is referred to as a paper conveying side 201, and the opposite side of the paper conveying side 201 is referred to as an anti-paper conveying side 202.

Although not illustrated, the image forming apparatus 10 includes a plurality of motors and a plurality of moving parts for driving the image forming unit 20, the conveying unit 60, and the scanner 70, and for other purposes. As moving parts, there are clutches, fans, various rollers, and the like. For this reason, in the image forming apparatus 10, various types of sound are generated inside the housing 200 due to the driving of the motor.

Such sound includes motor drive sound, fan sound, clutch sound, sound of collision of paper and a registration roller, sound of paper bending after the paper collides with the registration roller, and sound of collision of paper and a paper conveying guide. The generated sound leaks from the inside to the outside of the housing 200.

Figure 3:
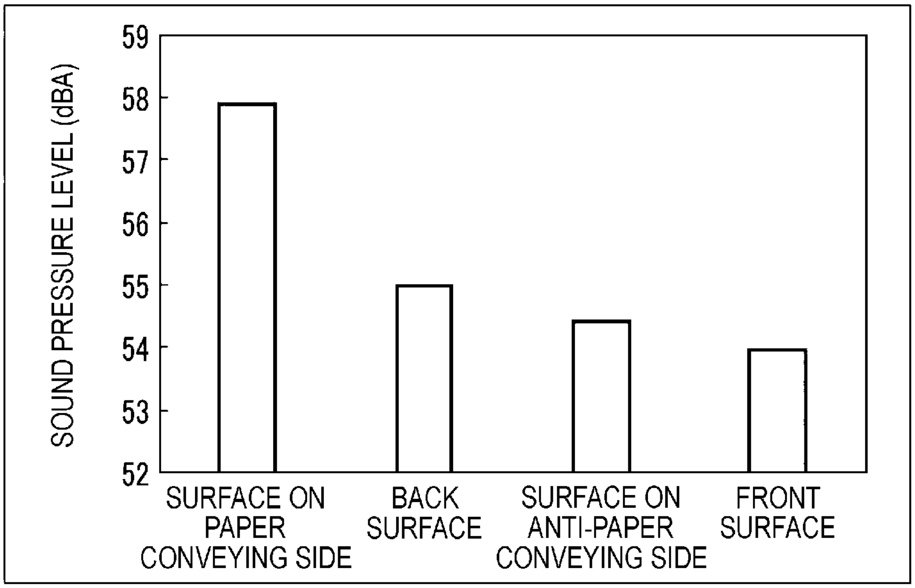
FIG. 3 is a graph illustrating a sound pressure level measured at a position 1 m away from a surface on a paper conveying side, a back surface, a surface on an anti-paper conveying side, and a front surface in an image forming apparatus of the related art.

FIG. 3 is a graph illustrating a sound pressure level measured at a position 1 m away from the surface on the paper conveying side, the back surface, the surface on the anti-paper conveying side, and the front surface in the image forming apparatus of the related art. From FIG. 3, it can be seen that the sound pressure level is the highest on the paper conveying side. That is, the sound leaking from the inside to the outside of the housing of the image forming apparatus is the loudest on the paper conveying side.

The sound leaking from the image forming apparatus causes discomfort to persons around the image forming apparatus, who hear the sound with the ears. As can be seen from the graph of FIG. 3, this is significant for the persons who are located on the side of the paper conveying side surface of the image forming apparatus.

For this reason, it is preferable that the image forming apparatus is provided with the mechanism that makes it difficult to hear the sound leaking from the image forming apparatus with the ears of persons around the image forming apparatus, particularly, the persons who are located on the side of the paper conveying side surface of the image forming apparatus. That is, it is preferable to take noise countermeasures.

As one of the noise countermeasures, there is a method of providing a sound absorbing material on the side wall of the paper conveying side of the housing of the image forming apparatus. However, this method increases the costs.

As illustrated in FIG. 1, the image forming apparatus 10 according to the embodiment has an opening 210 on the side wall of the paper conveying side 201 of the housing 200. The opening 210 is open only downward. Hereinafter, the specific configuration example of the opening 210 will be described with reference to the drawings.

In the following, for the convenience of description, the following assumptions are made. The housing 200 of the image forming apparatus 10 has an upper side wall 211 and a lower side wall 212. The opening 210 has a space 213 connecting an inside 214 and an outside 215 of the housing 200 and a peripheral portion of the space 213 between the upper side wall 211 and the lower side wall 212. Further, the peripheral portion of the space 213 between the upper side wall 211 and the lower side wall 212 is simply referred to as an upper side wall 211 and a lower side wall 212. Similarly, a portion of the space 213 between the upper side wall 211 and the lower side wall 212 is simply referred to as a space 213.

The upper side wall 211 and the lower side wall 212 are separated from each other, and a space therebetween is defined as the space 213. Further, the upper side wall 211 and the lower side wall 212 have surfaces facing each other, and these surfaces are referred to as a facing surface 217 of the upper side wall 211 and a facing surface 218 of the lower side wall 212, respectively. That is, the facing surface 217 of the upper side wall 211 is a portion of the inner side wall surface of the upper side wall 211, and the facing surface 218 of the lower side wall 212 is a portion of the outer side wall surface of the lower side wall 212. Further, the portion simply referred to as the space 213 described above is the portion of the space 213 located on the facing surface 217 of the upper side wall 211 and the facing surface 218 of the lower side wall 212.

Figure 4:
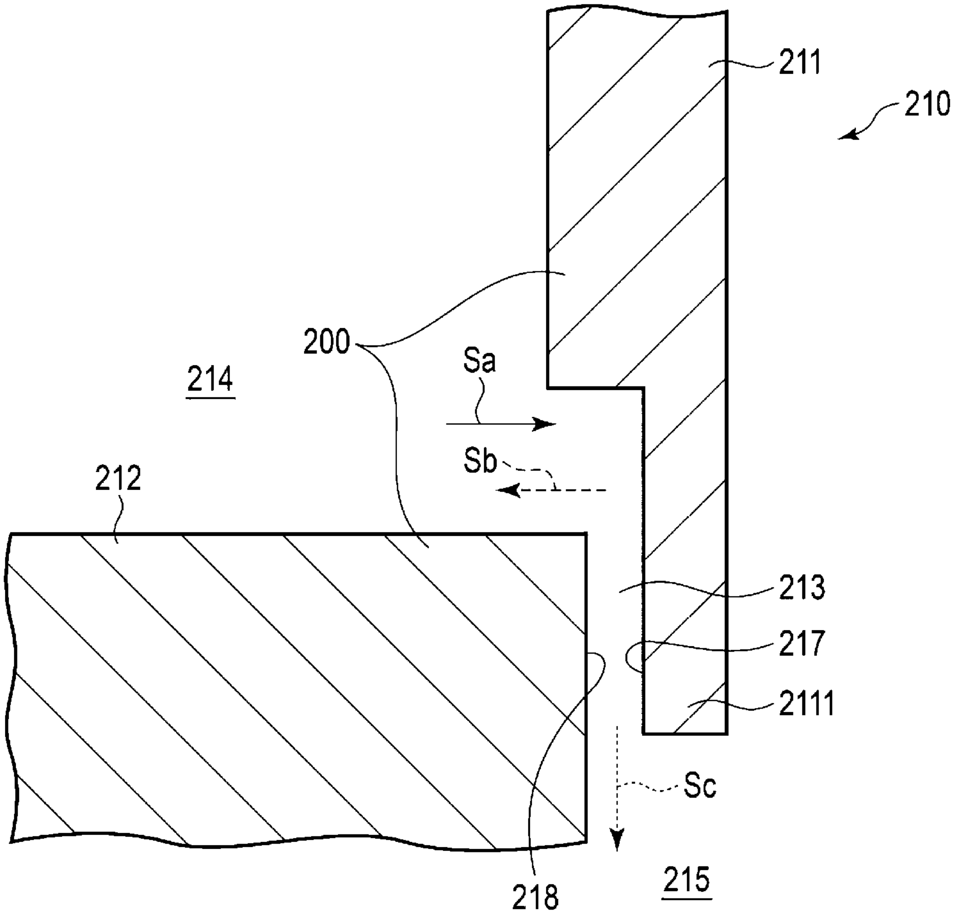
FIG. 4 is a longitudinal cross-sectional view illustrating an example of a configuration of an opening included in a housing of the image forming apparatus of FIG. 1.

First, an example of a configuration of the opening 210 will be described with reference to FIG. 4. FIG. 4 is a longitudinal cross-sectional view illustrating the example of the configuration of the opening 210. The opening 210 in FIG. 4 is the simplest configuration example of the opening 210.

In the configuration example of the opening 210 in FIG. 4, the upper side wall 211 has a downward extending portion 2111. The downward extending portion 2111 is located on the outside, that is, on the right side of the lower side wall 212. The downward extending portion 2111 further extends downward away from the lower side wall 212. These pairs of facing surfaces 217 and 218 face each other, for example, in parallel. Therefore, the space 213 connecting the inside 214 and the outside 215 of the housing 200 is open only downward, but is not open laterally or upward.

Specifically, the facing surface 218 is a portion of the outer side surface of the lower side wall 212 facing the inner side surface of the downward extending portion 2111 of the upper side wall 211. Further, the facing surface 217 is a portion of the inner side surface of the downward extending portion 2111 of the upper side wall 211 facing the outer side surface of the lower side wall 212.

In FIG. 4, the downward extending portion 2111 of the upper side wall 211 is drawn to have a smaller thickness, that is, the lateral dimension than the portion of the upper side wall 211 above the downward extending portion 2111. However, this is one simple example.

In the opening 210 of FIG. 4, the sound Sa generated inside the housing 200 passes through the space 213, and the sound Sc leaking from the housing 200 travels downward. For this reason, the leaking sound Sc is hard to hear with ears of persons around the image forming apparatus 10.

Further, the sound Sa generated inside the housing 200 is reflected by the downward extending portion 2111 of the upper side wall 211. The sound Sb reflected by the downward extending portion 2111 of the upper side wall 211 interferes with the sound Sa traveling to the downward extending portion 2111 of the upper side wall 211. As the result, the sound Sa generated inside the housing 200 is reduced.

Herein, the comparison result of an acoustic power level with and without the opening 210 is as follows. If the opening 210 is absent, the acoustic power level is 67.7 dBa. On the other hand, if the opening 210 is present, the acoustic power level is 67.3 dBa. That is, the image forming apparatus 10 according to the embodiment achieves the reduction of 0.3 dBa of the sound leaking from the housing 200 with the opening 210 of the housing 200 as compared with the image forming apparatus of the related art.

Figure 5:
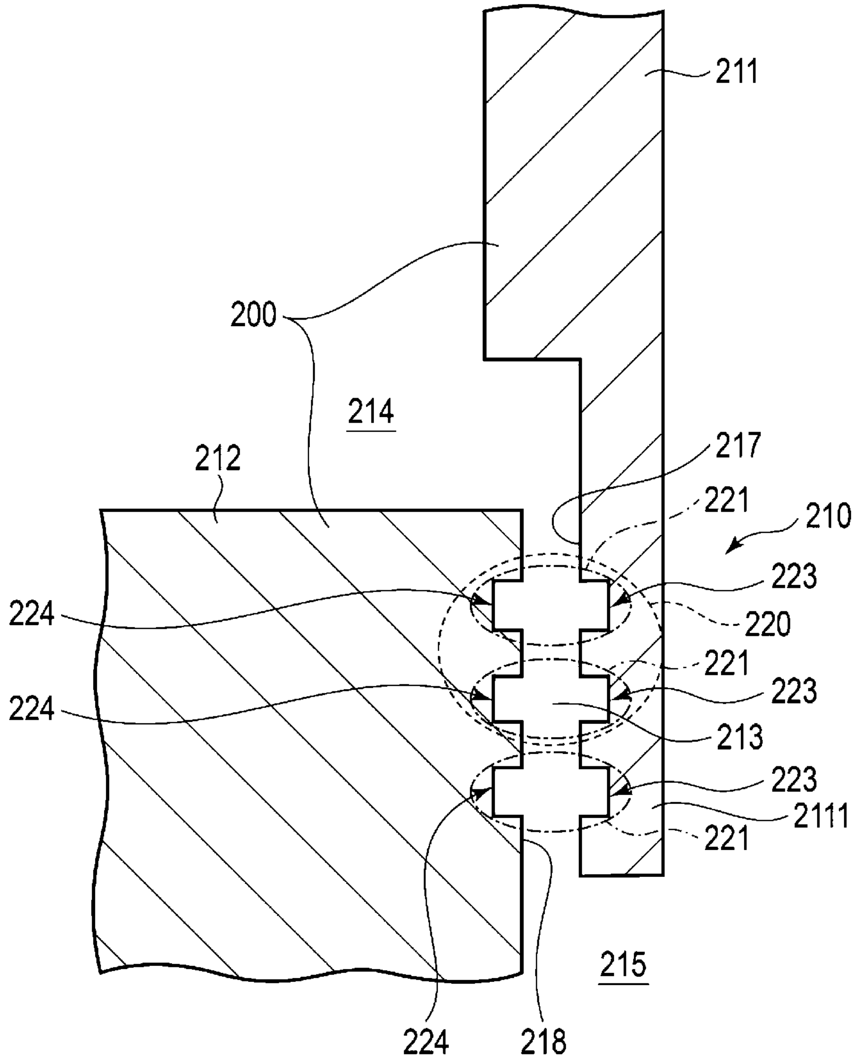
FIG. 5 is a longitudinal cross-sectional view illustrating another example of the configuration of the opening included in the housing of the image forming apparatus of FIG. 1.

Next, the example of another configuration of the opening 210 will be described with reference to FIG. 5. FIG. 5 is a longitudinal cross-sectional view illustrating another example of the configuration of the opening 210. In the following, changed portions from the configuration example of the opening 210 in FIG. 4 will be discussed. That is, the members and the like in FIG. 4 and the members and the like in FIG. 5 having the same reference numerals are the same.

The opening 210 in FIG. 5 has a cross-sectional area changing portion 221 that changes the cross-sectional area of the space 213 in the middle of the space 213 connecting the inside 214 and the outside 215 of the housing 200. In other words, the opening 210 in FIG. 5 is provided with the cross-sectional area changing portion 221 with respect to the opening 210 in FIG. 4. The opening 210 in FIG. 5 has, as an example, the three cross-sectional area changing portions 221.

Herein, the cross-sectional area of the space 213 is the area of the space 213 on a virtual plane perpendicular to the vertical direction. The number of cross-sectional area changing portions 221 of three is merely an example. The number of cross-sectional area changing portions 221 is not limited to three, and may be any other number. For example, the number of cross-sectional area changing portions 221 may be one or plural.

The cross-sectional area changing portion 221 has a function of muting sound passing through the space 213. Herein, muting does not denote muting sound literally, but denote reducing a sound amount thereof.

Figure 6:
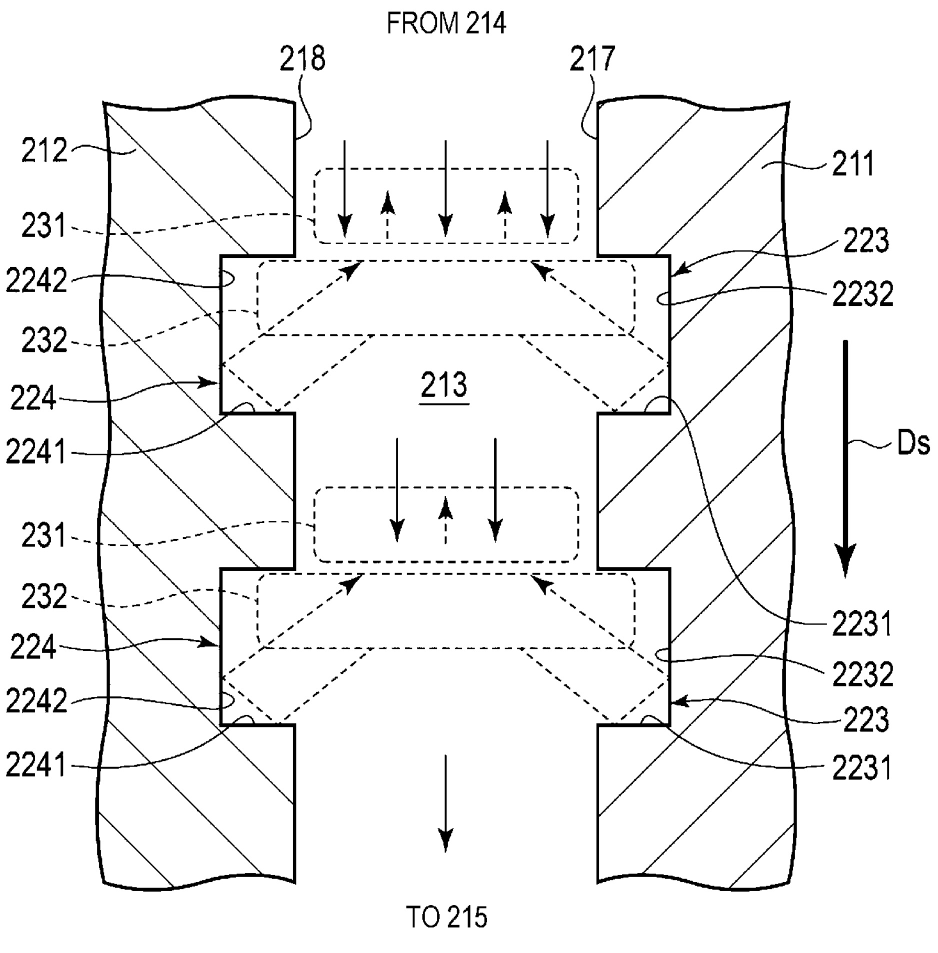
FIG. 6 is an enlarged longitudinal cross-sectional view illustrating a portion surrounded by an ellipse of a broken line in FIG. 5.

Hereinafter, a mechanism of muting by the cross-sectional area changing portion 221 will be described with reference to FIG. 6. FIG. 6 is an enlarged longitudinal cross-sectional view illustrating a portion of FIG. 5 surrounded by an ellipse 220 of a broken line in FIG. 5.

As illustrated in FIG. 6, each cross-sectional area changing portion 221 has a recess portion 223 which is a non-flat portion formed on the facing surface 217 of the upper side wall 211 and a recess portion 224 which is a non-flat portion formed on the facing surface 218 of the lower side wall 212. That is, each cross-sectional area changing portion 221 has a pair of non-flat portions, and the pair of non-flat portions is a pair of the recess portion 223 and the recess portion 224.

The recess portion 223 of the upper side wall 211 and the recess portion 224 of the lower side wall 212 in each cross-sectional area changing portion 221 are located at the same position in the vertical direction. That is, a bottom surface 2232 of the recess portion 223 of the upper side wall 211 and a bottom surface 2242 of the recess portion 224 of the lower side wall 212 face each other at the same position in the vertical direction. For example, the recess portion 223 of the upper side wall 211 and the recess portion 224 of the lower side wall 212 in each cross-sectional area changing portion 221 are parallel to each other.

In a traveling direction Ds of sound traveling from the inside 214 to the outside 215 of the housing 200, acoustic impedance changes in a pre-entry portion 231 and a post-entry portion 232 with respect to the cross-sectional area changing portion 221. Specifically, in the traveling direction Ds of the sound, the acoustic impedance of the cross-sectional area changing portion 221 in the post-entry portion 232 is smaller than the acoustic impedance of the cross-sectional area changing portion 221 in the pre-entry portion 231.

For this reason, the sound that enters the cross-sectional area changing portion 221 is diffused, and the sound pressure after passing through the cross-sectional area changing portion 221 is reduced. Further, a portion of the diffused sound is reflected by lower side surfaces 2231 and 2241 and the bottom surfaces 2232 and 2232 of the recess portions 223 and 224 and returns to the inside 214 of the housing 200. The sound returning to the inside 214 of the housing 200 interferes with the sound traveling to the cross-sectional area changing portion 221 and is muted.

As illustrated in FIG. 6, if the opening 210 has the plurality of cross-sectional area changing portions 221, for example, in the traveling direction Ds of the sound traveling from the inside 214 to the outside 215 of the housing 200 by the above-mentioned function, the sound muted by the first cross-sectional area changing portion 221 is further muted by the second cross-sectional area changing portion 221.

Figure 7:
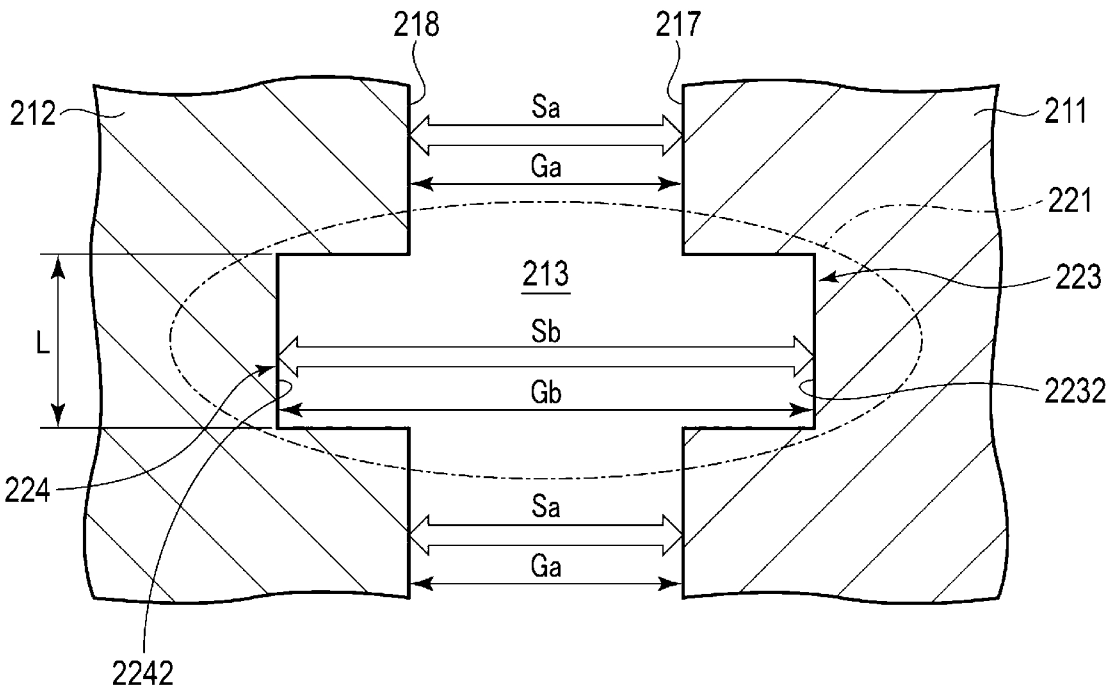
FIG. 7 is a cross-sectional view illustrating one cross-sectional area changing portion and a peripheral portion thereof.

Next, an attenuation amount (dB) of sound by one cross-sectional area changing portion 221 (the recess portion 223 and the recess portion 224) will be described with reference to FIG. 7. FIG. 7 is a cross-sectional view illustrating one cross-sectional area changing portion 221 and a peripheral portion thereof. In FIG. 7, Sb represents a cross-sectional area of the cross-sectional area changing portion 221, Sa represents a cross-sectional area of an upward portion and a downward portion of the cross-sectional area changing portion 221, and L represents a length of the cross-sectional area changing portion 221 (dimensions of the bottom surface 2232 of the recess portion 223 and the bottom surface 2242 of the recess portion 224 in the vertical direction).

Herein, since the cross-sectional area changing portion 221 is provided with respect to the opening 210 in FIG. 4, the cross-sectional area Sa of the upward portion and the cross-sectional area Sa of the downward portion of the cross-sectional area changing portion 221 are equal. Further, the length L of the cross-sectional area changing portion 221 is the dimensions of the bottom surface 2232 of the recess portion 223 and the bottom surface 2242 of the recess portion 224 in the vertical direction.

In this relationship, the attenuation amount (dB) of sound by one cross-sectional area changing portion 221 (that is, the recess portion 223 and the recess portion 224) is expressed by the following mathematical formula (1).

[Mathematical Formula 1]

Attenuation Amount $$(\mathrm{dB}) \fallingdotseq 10\log_{10}\left\{1+\frac{1}{4}\left[m-\frac{1}{m}\right]^2\sin^2 kL\right\} \tag{1}$$

Herein, m=Sb/Sa, k=2π/λ, and λ is the wavelength of the sound.

Further, in FIG. 7, Ga represents a gap between the facing surface 217 of the upper side wall 211 and the facing surface 218 of the lower side wall 212, and Gb is a gap between the recess portion 223 and the recess portion 224 (specifically, a gap between the bottom surface 2232 of the recess portion 223 and the bottom surface 2242 of the recess portion 224). Herein, assuming that the length of the depth of the space 213 is set to D, Sa=Ga×D, and Sb=Gb×D.

Figure 8:
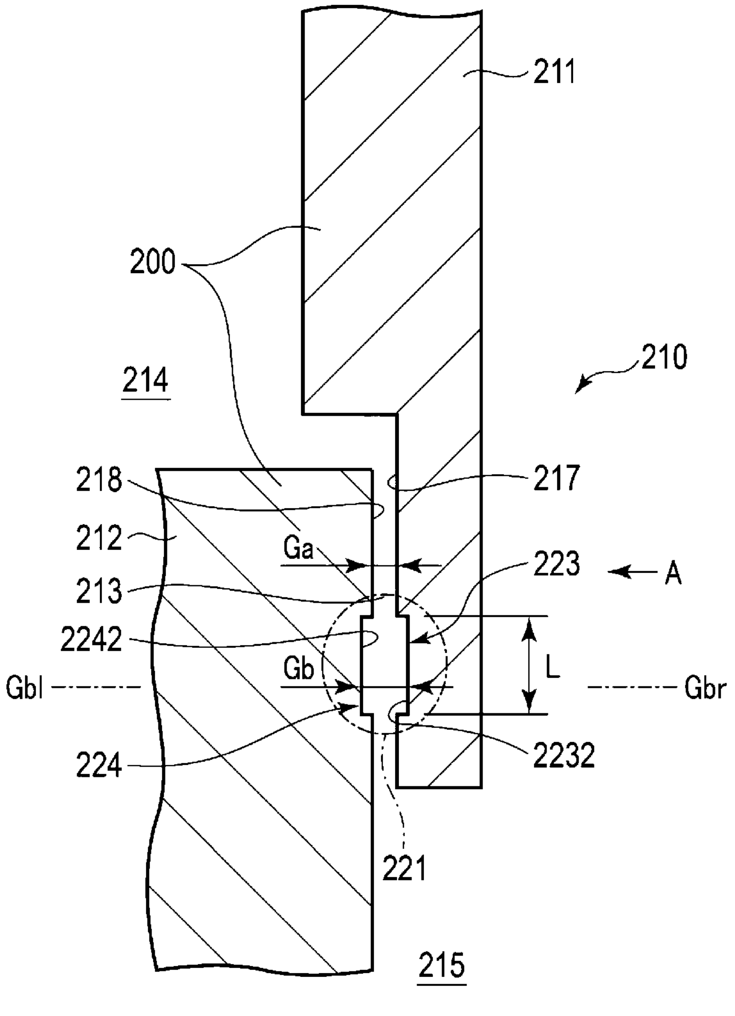
FIG. 8 is a longitudinal cross-sectional view of an opening having one cross-sectional area changing portion.

Subsequently, the influence on the attenuation amount (dB) of sound at each frequency due to the difference in length of the cross-sectional area changing portion 221 (the recess portion 223 and the recess portion 224) will be described with reference to FIGS. 8 to 11. Herein, an example is considered in which the opening 210 has one cross-sectional area changing portion 221 (the recess portion 223 and the recess portion 224). FIG. 8 is a longitudinal cross-sectional view of the opening 210 having one cross-sectional area changing portion 221.

In FIG. 8, Ga represents a gap between the facing surface 217 (of the downward extending portion 2111) of the upper side wall 211 and the facing surface 218 of the lower side wall 212, Gb represents a gap between the recess portion 223 and the recess portion 224 (specifically, a gap between the bottom surface 2232 of the recess portion 223 and the bottom surface 2242 of the recess portion 224), and L represents a length of the cross-sectional area changing portion 221 (the recess portion 223 and the recess portion 224).

Figure 9:
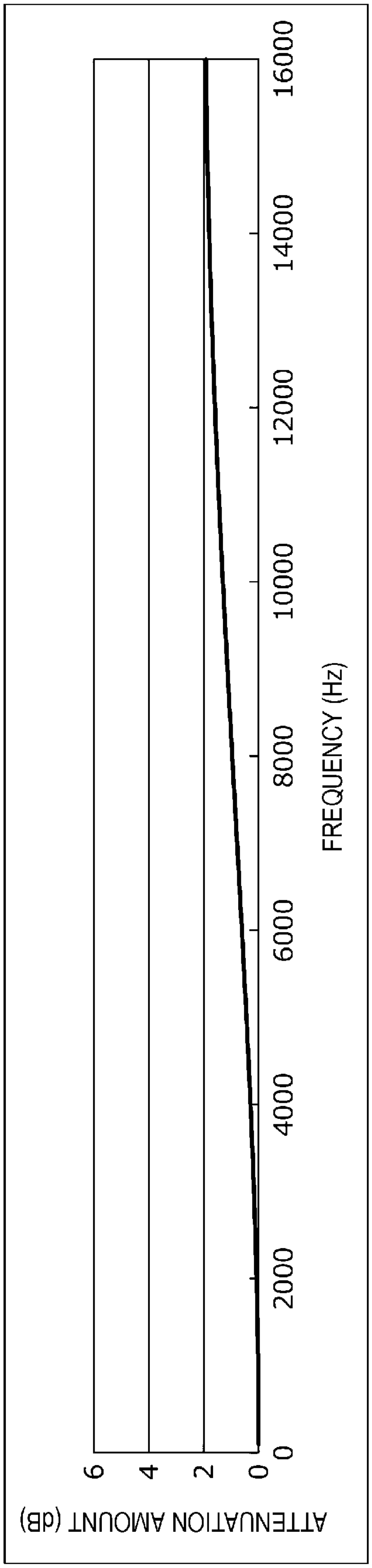
FIG. 9 is a graph illustrating an attenuation amount (dB) of sound at each frequency due to the opening of FIG. 8 having a recess portion length L=0.005 m.
Figure 10:
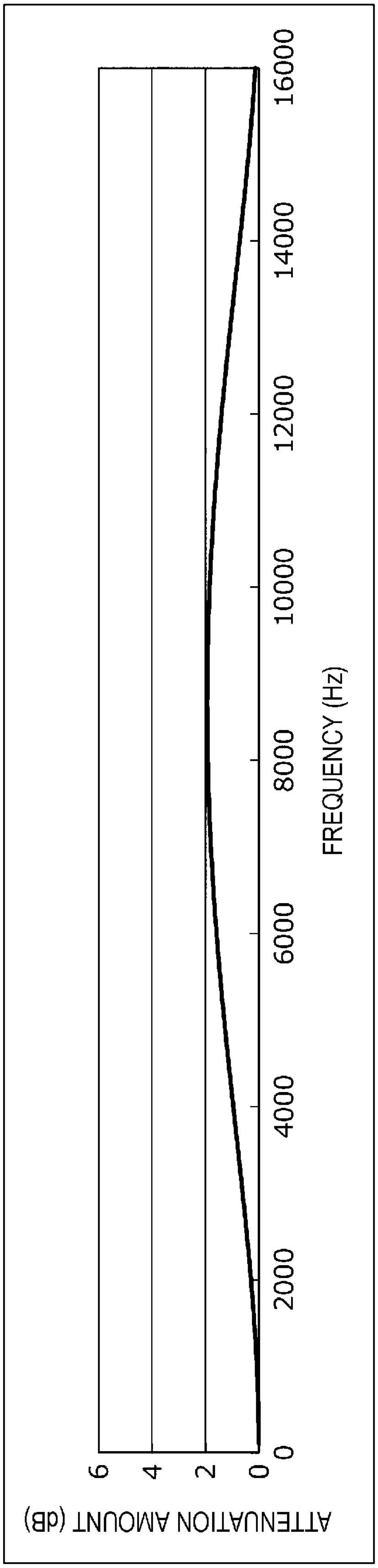
FIG. 10 is a graph illustrating the attenuation amount (dB) of sound at each frequency due to the opening of FIG. 8 having a recess portion length L=0.010 m.
Figure 11:
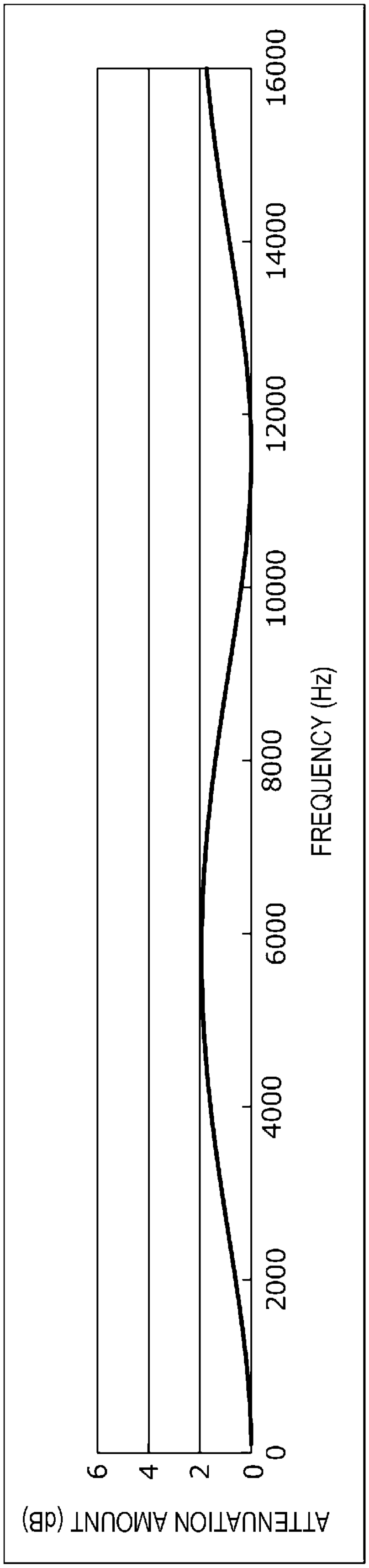
FIG. 11 is the graph illustrating the attenuation amount (dB) of sound at each frequency due to the opening of FIG. 8 having a recess portion length L=0.015 m.

FIGS. 9 to 11 are graphs illustrating the difference in attenuation amount (dB) of sound at each frequency due to the difference in length L between the recess portion 223 and the recess portion 224. All the graphs of FIGS. 9 to 11 are acquired under the conditions of the constant value of gap Ga=0.001 m, the constant value of gap Gb=0.002 m, and, although not illustrated in FIG. 8, the constant value of length D of the depth of the space 213=0.63.

FIG. 9 is a graph illustrating the attenuation amount (dB) of sound at each frequency at the length L=0.005 m of the recess portion 223 and the recess portion 224. FIG. 10 is a graph illustrating the attenuation amount (dB) of sound at each frequency at the length L=0.10 m of the recess portion 223 and the recess portion 224. FIG. 11 is a graph illustrating the attenuation amount (dB) of sound at each frequency at the length L=0.15 m of the recess portion 223 and the recess portion 224.

In the graph of FIG. 9, the sound having the frequency (Hz) at which the attenuation (dB)=0 is not present except for the frequency (Hz)=0 (silence), but such sound is present in the graph of FIG. 10 and the graph of FIG. 11. Further, the graph of FIG. 10 has the higher frequency (Hz) at which the attenuation amount (dB)=0 and generally the larger attenuation amount (dB) than the graph of FIG. 11. From the graphs of FIGS. 9 to 11, it can be seen that, if the opening 210 has only one cross-sectional area changing portion 221, it is preferable that the length L of the cross-sectional area changing portion 221 is short.

Next, the influence of a difference in number of cross-sectional area changing portions 221 (the recess portion 223 and the recess portion 224) on the attenuation amount (dB) of sound at each frequency will be described with reference to FIGS. 12 to 15.

Figure 12:
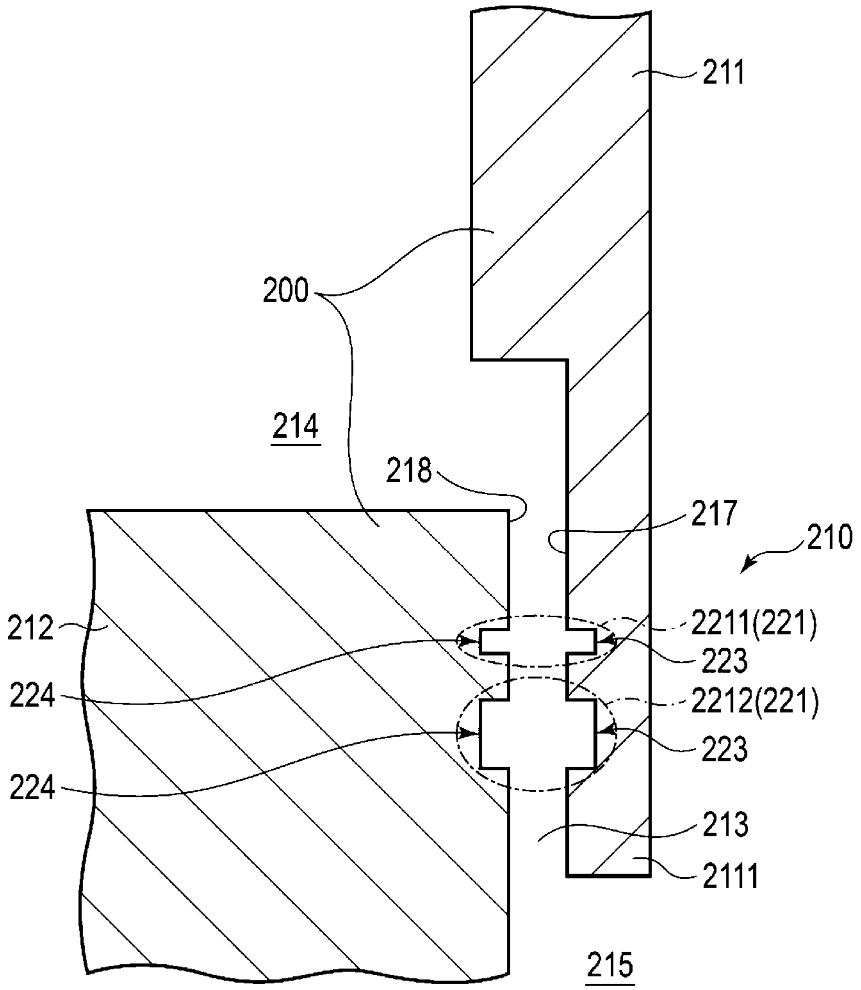
FIG. 12 is a longitudinal cross-sectional view of an opening having two cross-sectional area changing portions.

First, an example in which the opening 210 has the two cross-sectional area changing portions 221 is considered with reference to FIG. 12. FIG. 12 is a longitudinal cross-sectional view of the opening 210 having the two cross-sectional area changing portions 221.

The opening 210 in FIG. 12 has the two cross-sectional area changing portions 221, that is, a cross-sectional area changing portion 2211 and a cross-sectional area changing portion 2212 in order from the above. Each of the cross-sectional area changing portions 2211 and 2212 has the recess portion 223 and the recess portion 224. The length of the cross-sectional area changing portion 2211 and the length of the cross-sectional area changing portion 2212 are different.

In the opening 210 of FIG. 12, the dimensions of the gap Ga between the facing surface 217 of the upper side wall 211 and the facing surface 218 of the lower side wall 212, the gap Gb between the recess portion 223 and the recess portion 224, and the length D of the depth of the space 213 are the same as those of the opening 210 in FIG. 9. That is, Ga=0.001 m, Gb=0.002 m, and D=0.63.

The length of the cross-sectional area changing portion 2211 is 0.05 m. Further, the length of the cross-sectional area changing portion 2212 is 0.15 m. The attenuation amount (dB) of sound at each frequency by the cross-sectional area changing portion 2211 alone is as illustrated in the graph of FIG. 9. Further, the attenuation amount (dB) of sound at each frequency by the cross-sectional area changing portion 2212 alone is as illustrated in the graph of FIG. 11.

Figure 13:
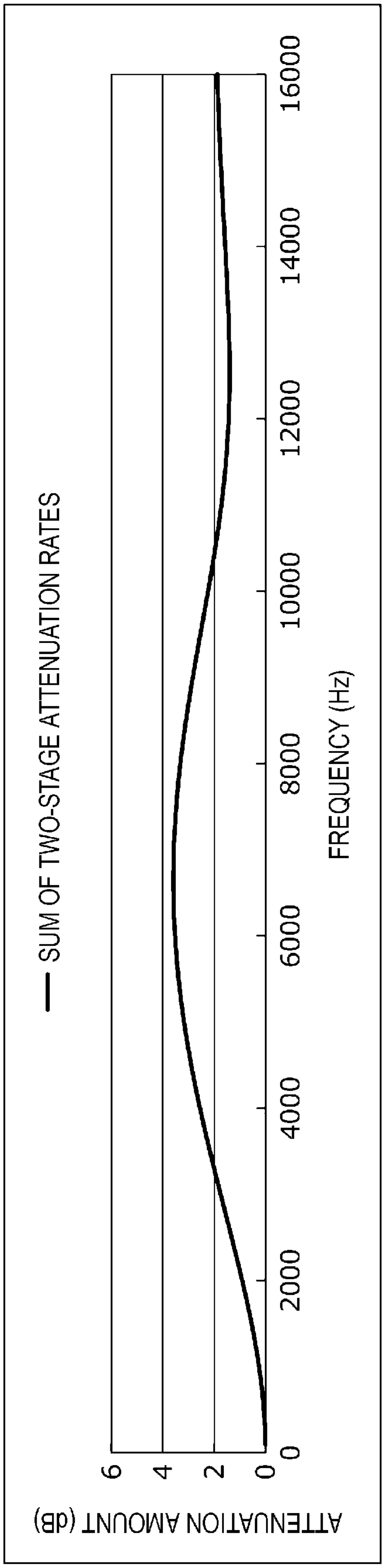
FIG. 13 is the graph illustrating the attenuation amount (dB) of sound at each frequency due to the opening in FIG. 12.

FIG. 13 is a graph illustrating the attenuation amount (dB) of sound at each frequency by the opening 210 of FIG. 12 having such two cross-sectional area changing portions 221, that is, the cross-sectional area changing portion 2211 and the cross-sectional area changing portion 2212. In the graph of FIG. 13, the sound having the frequency (Hz) at which the attenuation amount (dB)=0 is not present except to the frequency (Hz)=0 (silence). Further, the attenuation amount (dB) of the opening 210 of FIG. 12 having two cross-sectional area changing portions 221 is generally larger than the attenuation amount (dB) of the opening 210 of FIG. 12 having only one cross-sectional area changing portion 221.

Figure 14:
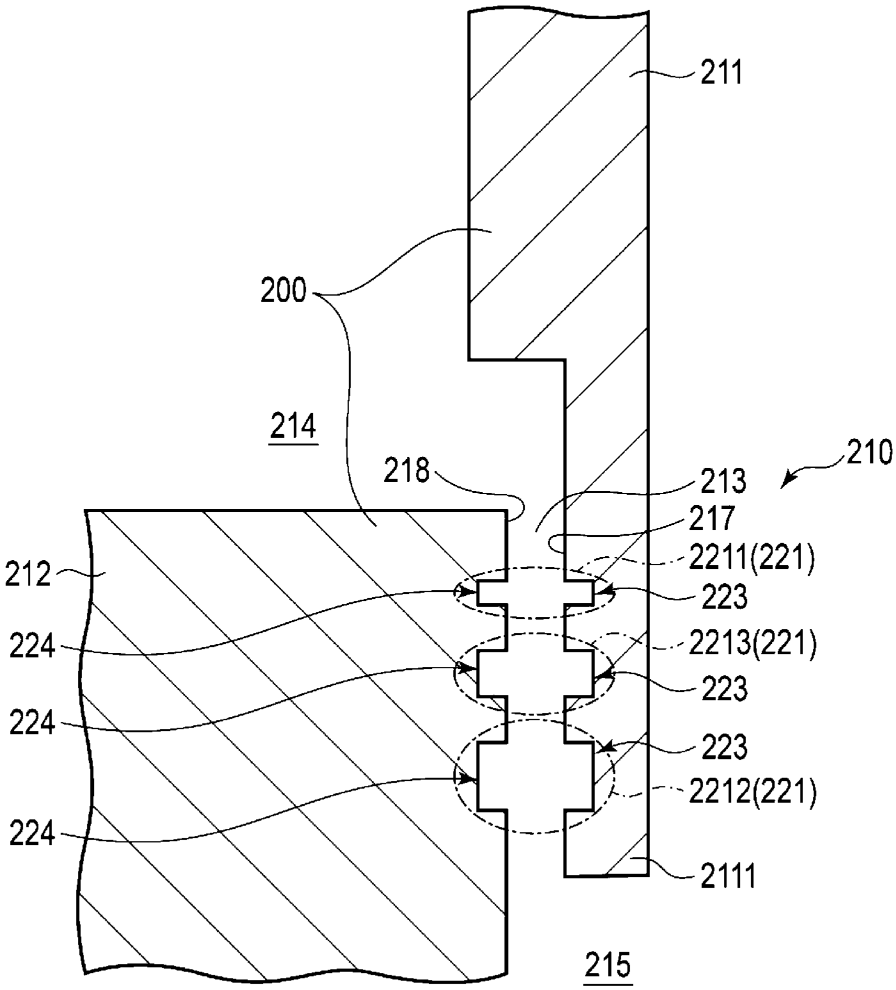
FIG. 14 is a longitudinal cross-sectional view of an opening having three cross-sectional area changing portions.

Next, an example in which the opening 210 has three cross-sectional area changing portions 221 is considered with reference to FIG. 14. FIG. 14 is a longitudinal cross-sectional view of the opening 210 having the three cross-sectional area changing portions 221.

The opening 210 in FIG. 14 has the three cross-sectional area changing portions 221, that is, the cross-sectional area changing portion 2211, a cross-sectional area changing portion 2213, and the cross-sectional area changing portion 2212 in order from the above. All the cross-sectional area changing portions 2211, 2212, and 2213 have the recess portion 223 and the recess portion 224. The length of the cross-sectional area changing portion 2211, the length of the cross-sectional area changing portion 2212, and the length of the cross-sectional area changing portion 2213 are different from each other.

In the opening 210 of FIG. 14, the dimensions of the gap Ga between the facing surface 217 of the upper side wall 211 and the facing surface 218 of the lower side wall 212, the gap Gb between the recess portion 223 and the recess portion 224, and the length D of the depth of the space 213 are the same as those of the opening 210 in FIG. 9. That is, Ga=0.001 m, Gb=0.002 m, and D=0.63.

The length of the cross-sectional area changing portion 2211 is 0.05 m. The length of the cross-sectional area changing portion 2213 is 0.10 m. The length of the cross-sectional area changing portion 2212 is 0.15 m. The attenuation amount (dB) of sound at each frequency by the cross-sectional area changing portion 2211 alone is as illustrated in the graph of FIG. 9. The attenuation amount (dB) of sound at each frequency by the cross-sectional area changing portion 2213 alone is as illustrated in the graph of FIG. 10. The attenuation amount (dB) of sound at each frequency by the cross-sectional area changing portion 2212 alone is as illustrated in the graph of FIG. 11.

Figure 15:
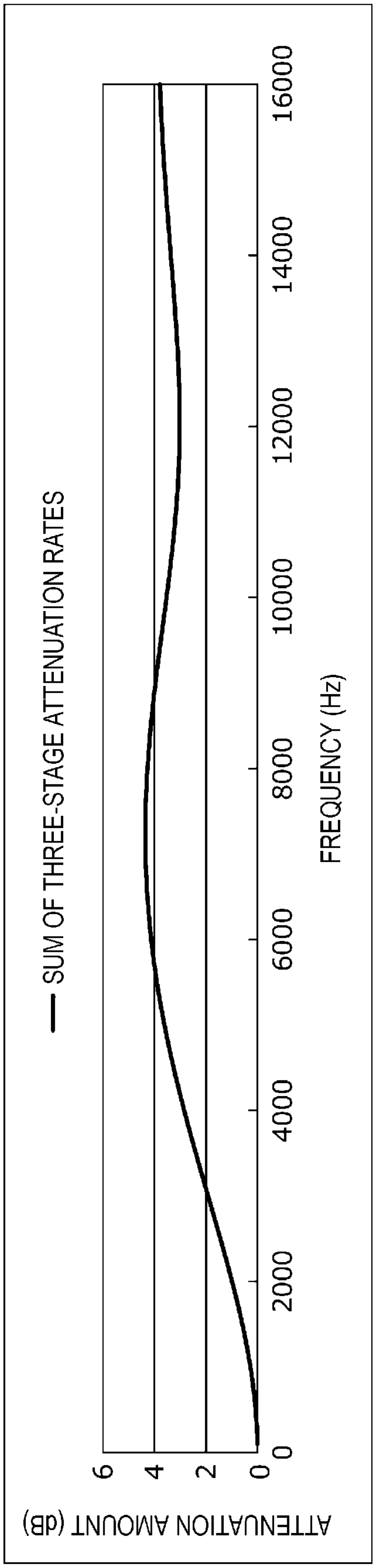
FIG. 15 is a graph illustrating the attenuation amount (dB) of sound at each frequency due to the opening in FIG. 14.

FIG. 15 is a graph illustrating the attenuation amount (dB) of sound at each frequency by the opening 210 of FIG. 14 having such three cross-sectional area changing portions 221, that is, the cross-sectional area changing portion 2211, the cross-sectional area changing portion 2212, and the cross-sectional area changing portion 2213. In the graph of FIG. 15, as in the graph of FIG. 13, the sound having the frequency (Hz) at which the attenuation amount (dB)=0 is not present except for the frequency (Hz)=0 (silence). Further, the attenuation amount (dB) of the opening 210 of FIG. 14 having the three cross-sectional area changing portions 221 is larger than the attenuation amount (dB) of the opening 210 of FIG. 12 having only one cross-sectional area changing portion 221.

Figure 16:
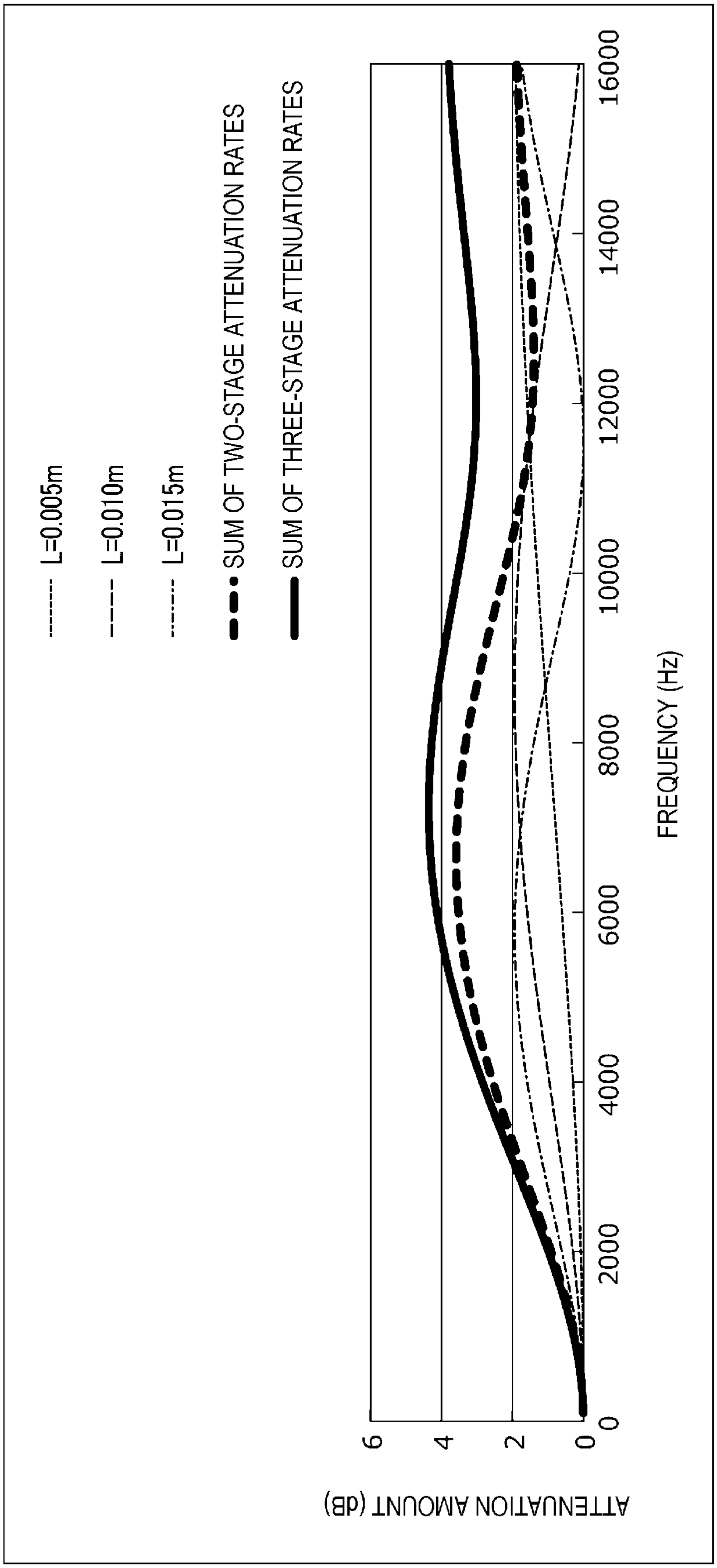
FIG. 16 is a graph illustrating the graphs of FIGS. 9 to 11, the graph of FIG. 13, and the graph of FIG. 15 in an overlapped manner.
Figure 18:
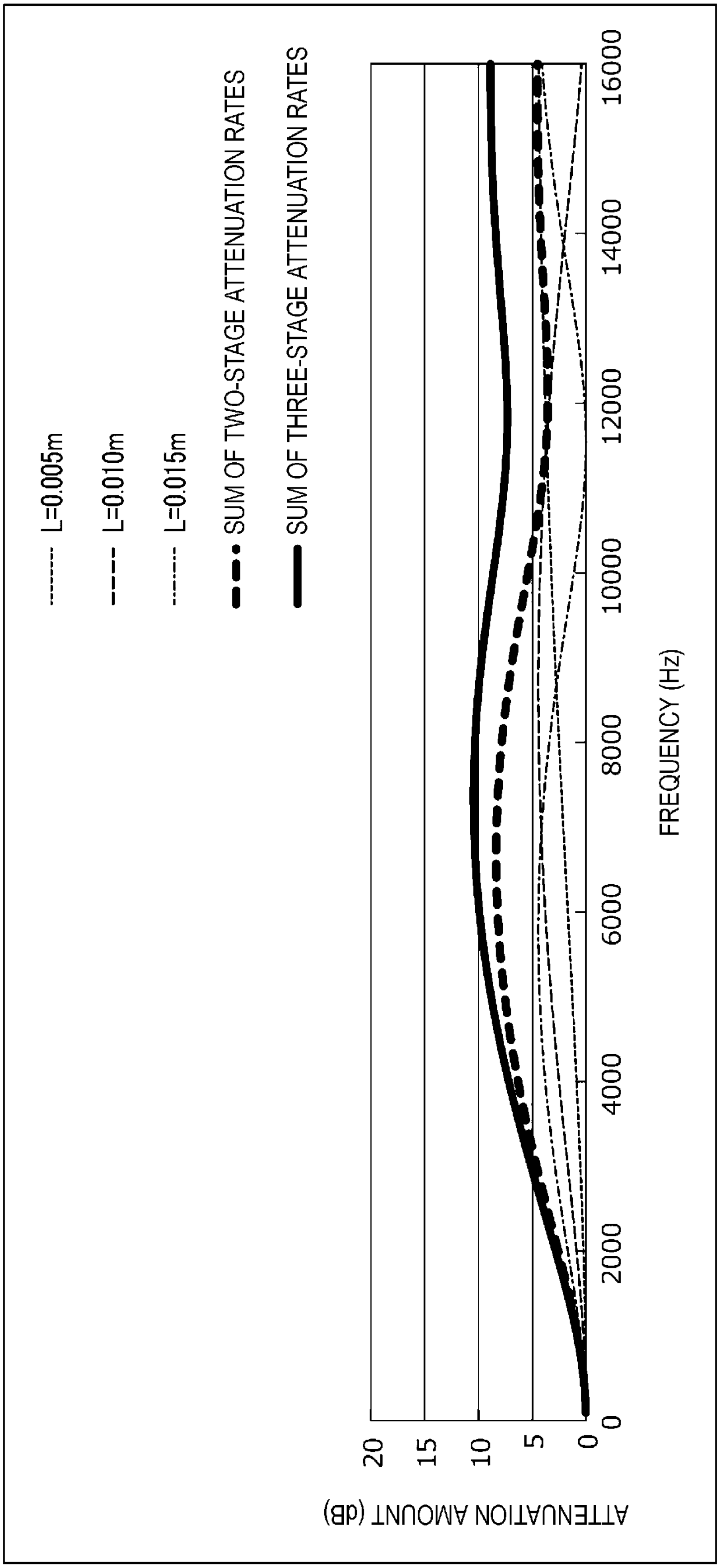
FIG. 18 is a graph illustrating the attenuation amount (dB) of sound at each frequency due to the opening having a gap ratio of Gb/Ga=3.
Figure 19:
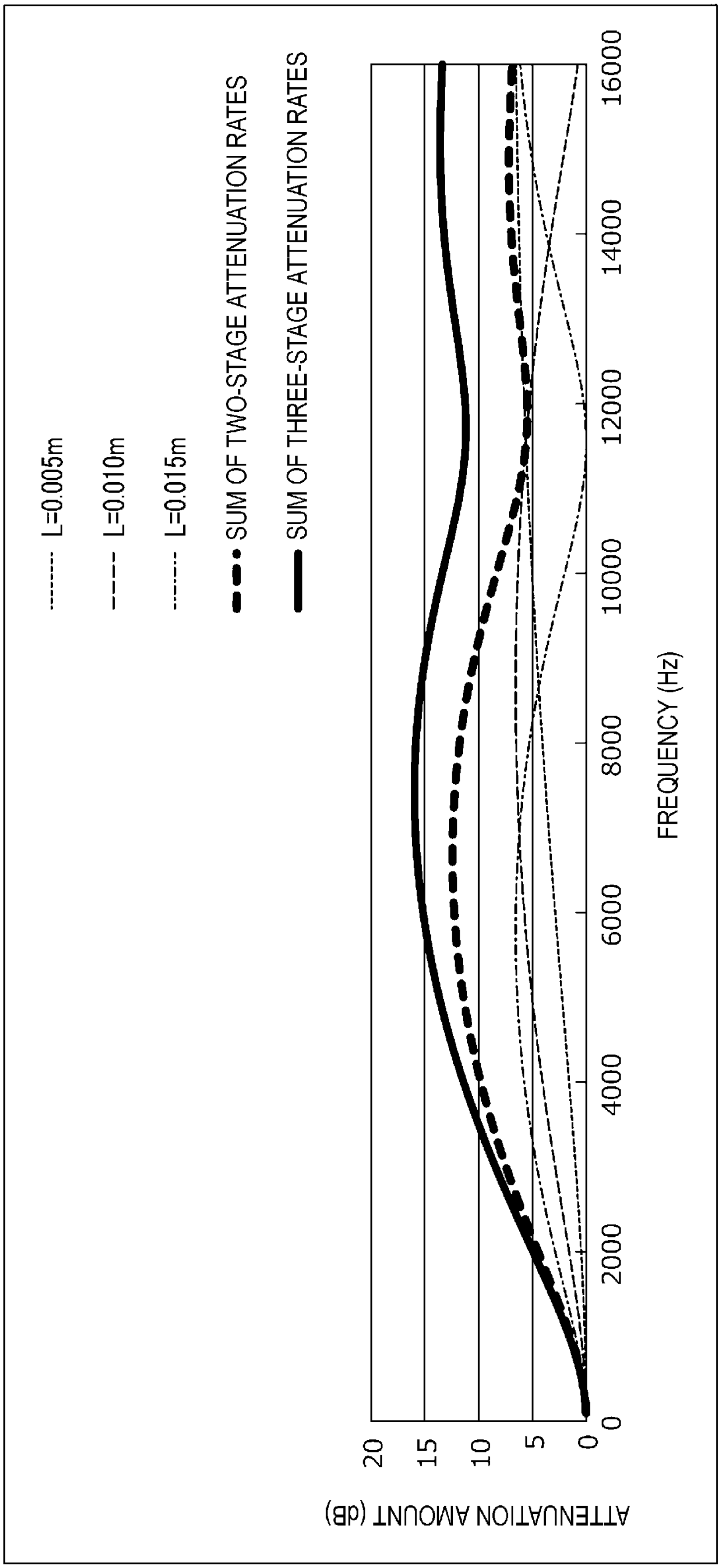
FIG. 19 is a graph illustrating the attenuation amount (dB) of sound at each frequency due to the opening having a gap ratio of Gb/Ga=4.

FIG. 16 is a graph illustrating the graphs of FIGS. 9 to 11, the graph of FIG. 13, and the graph of FIG. 15 in an overlapped manner. In FIG. 16, the curves of the graph if the opening 210 has only one cross-sectional area changing portion 221 are notated to be L=0.005 m, L=0.010 m, and L=0.015 m, respectively, according to the length L of the cross-sectional area changing portion 221. Further, the curves of the graph if the opening 210 has the plurality of cross-sectional area changing portions 221 are notated to be the sum of the two-stage attenuation rates and the sum of the three-stage attenuation rates, respectively, according to the number of the cross-sectional area changing portion 221. This notation method is the same for the graphs of FIGS. 17 to 19 illustrated later.

From the graph of FIG. 16, if the opening 210 has only one cross-sectional area changing portion 221, as described above, it can be seen that length L of the cross-sectional area changing portion 221 is preferably short. Further, if the opening 210 has the plurality of cross-sectional area changing portions 221, it can be seen that the number of cross-sectional area changing portions 221 is preferably large.

Subsequently, the influence on the attenuation amount (dB) of sound at each frequency due to the difference in ratio between the gap Ga of the facing surface 217 of the upper side wall 211 and the facing surface 218 of the lower side wall 212 and the gap Gb of the recess portion 223 and the recess portion 224 will be described with reference to FIGS. 17 to 19. Herein, FIGS. 17 to 19 are graphs illustrating the difference in attenuation amount (dB) of sound at each frequency due to the difference in gap ratio Gb/Ga. All the graphs of FIGS. 17 to 19 are obtained by changing only the value of the gap Gb. Other values are as described above. That is, the gap Ga=0.001 m, and the length D of the depth of the space 213=0.63. The lengths L of the recess portion 223 and the recess portion 224 are L=0.005 m, L=0.010 m, and L=0.015 m.

Figure 17:
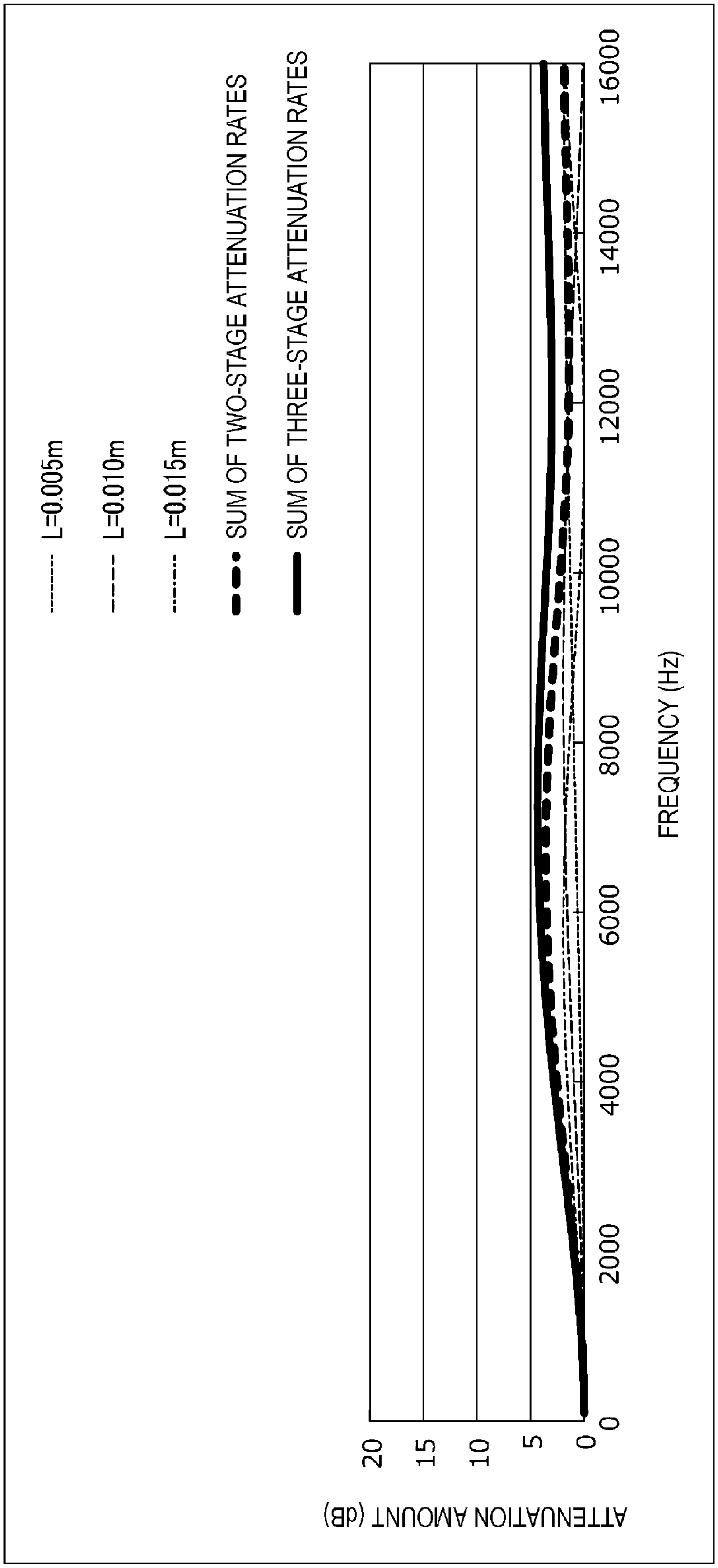
FIG. 17 is a graph illustrating the attenuation amount (dB) of sound at each frequency due to the opening having a gap ratio of Gb/Ga=2.

FIG. 17 is a graph illustrating the attenuation amount (dB) of sound at each frequency in the gap Gb=0.002 m, that is, Gb/Ga=2. FIG. 17 is also a graph in which the scale of the vertical axis of FIG. 16 illustrated above is changed. FIG. 18 is a graph illustrating the attenuation amount (dB) of sound at each frequency in the gap Gb=0.003 m, that is, Gb/Ga=3. FIG. 19 is a graph illustrating the attenuation amount (dB) of sound at each frequency in the gap Gb=0.004 m, that is, Gb/Ga=4.

From the graphs of FIGS. 17 to 19, it can be seen that, regardless of whether the opening 210 has only one cross-sectional area changing portion 221 or the opening 210 has the plurality of cross-sectional area changing portions 221, the ratio Gb/Ga is preferably large.

The graphs of FIGS. 17 to 19 are acquired under the condition that the dimensions of the gap Gb are constant value in order to reduce the gap Gb for ease of installation and arrangement. However, in the depth direction, the dimensions of the gap Gb may be taken to be large according to the location. In such a case, if the dimensions of the gap Gb are increased at that location, the ratio Gb/Ga of the gap Ga and the gap Gb is increased, and the effect of muting is increased.

Figure 20:
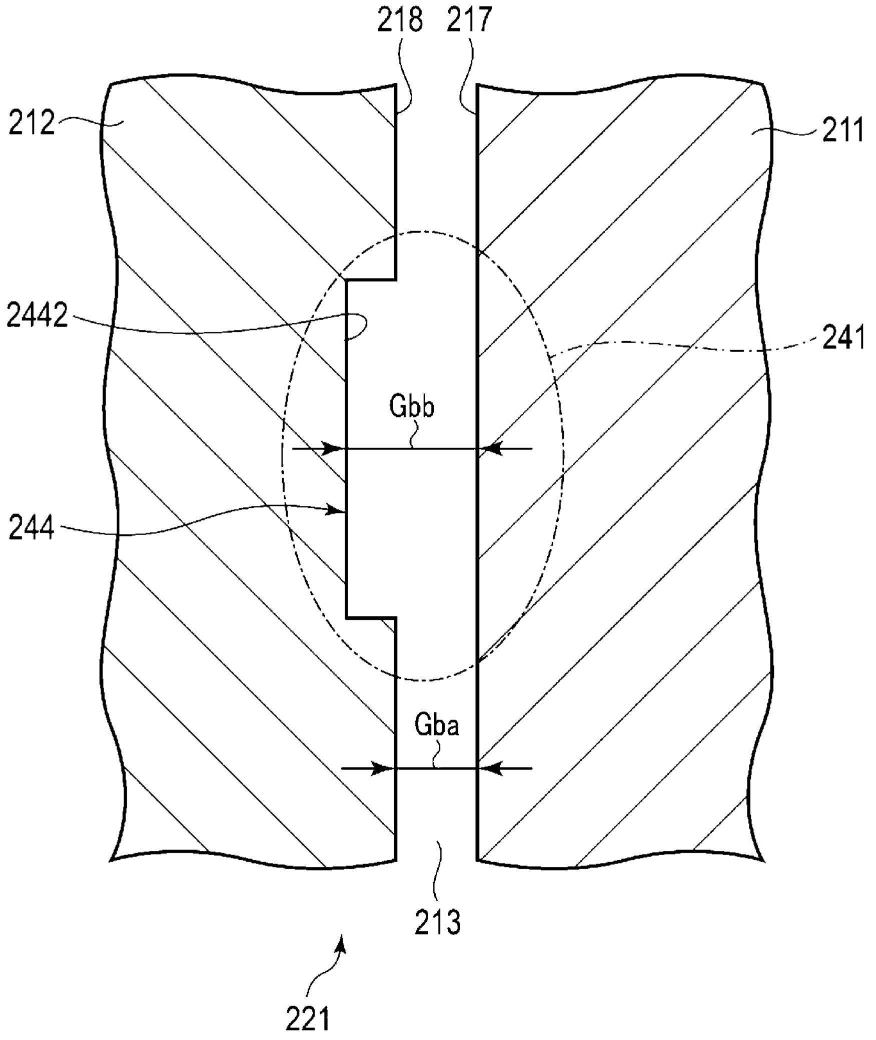
FIG. 20 is a transverse cross-sectional view of a portion of a cross-sectional area changing portion having a gap expansion portion in a portion in a depth direction.

FIG. 20 is a transverse cross-sectional view of the cross-sectional area changing portion 221 having such a configuration. That is, FIG. 20 is a transverse cross-sectional view of a portion 241 of the cross-sectional area changing portion 221 having the gap expansion portion 244 in a portion in the depth direction. The transverse cross section of FIG. 20 corresponds to the cross section taken along a Gbl-Gbr line of FIG. 8.

The cross-sectional area changing portion 221 of FIG. 20 has the gap expansion portion 244 on the facing surface 218 of the lower side wall 212 in at least a portion in the depth direction. The gap expansion portion 244 is a recess portion formed on the facing surface 218 of the lower side wall 212. A gap Gbb between the bottom surface 2442 of the gap expansion portion 244 of the lower side wall 212 and the facing surface 217 of the upper side wall 211 is larger than a gap Gba between the facing surface 218 of the lower side wall 212 and the facing surface 217 of the upper side wall 211.

With the cross-sectional area changing portion 221 having the configuration of FIG. 20, since the ratio Gb/Ga of the gap Ga to the gap Gb becomes large in a portion of the gap expansion portion 244, the muting effect becomes further large compared with the cross-sectional area changing portion 221 having the configuration having no gap expansion portion 244.

In the cross-sectional area changing portion 221 of FIG. 20, the lower side wall 212 has the gap expansion portion 244, but instead, the upper side wall 211 may have the gap expansion portion 244, or both the lower side wall 212 and the upper side wall 211 may have the gap expansion portion 244.

Figure 21:
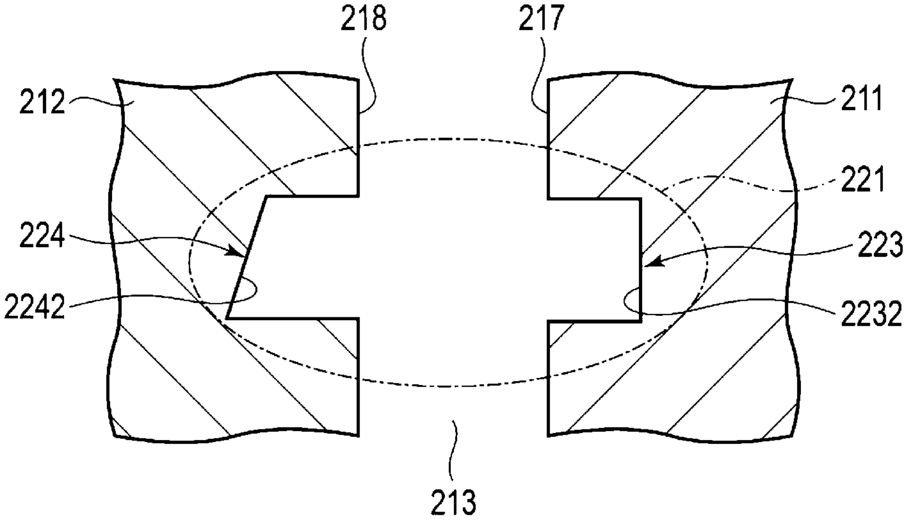
FIG. 21 is a diagram illustrating a modified example of one recess portion of the cross-sectional area changing portion.
Figure 22:
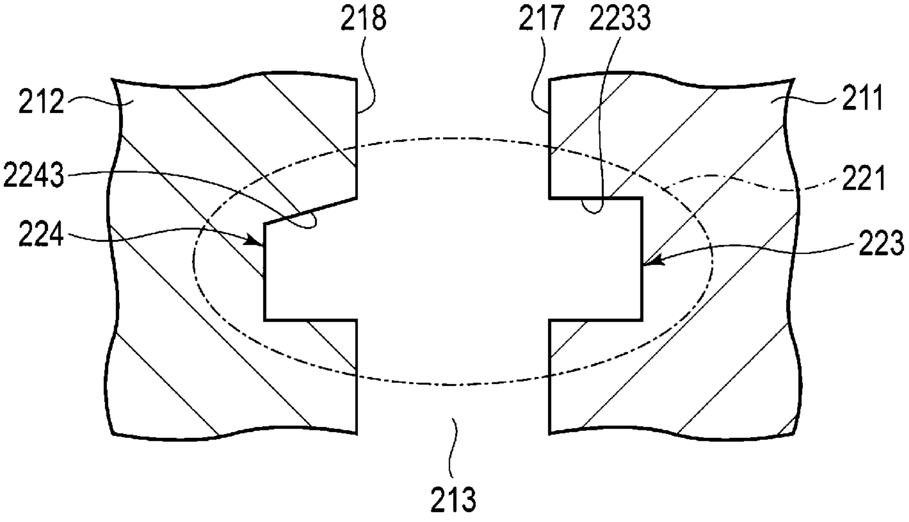
FIG. 22 is a diagram illustrating another modified example of one recess portion of the cross-sectional area changing portion.

In the description so far, although not specifically mentioned, as illustrated in the drawings, the recess portions 223 and 224 of the cross-sectional area changing portion 221 are assumed to be step difference portions recessed in parallel to the facing surfaces 217 and 218. However, the shape of the recess portions 223 and 224 is not limited thereto. FIGS. 21 and 22 are diagrams illustrating a modified example of one recess portion 224 of the cross-sectional area changing portion 221. In the cross-sectional area changing portion 221 of FIG. 21, the bottom surface 2242 of the recess portion 224 of the lower side wall 212 is not parallel to the bottom surface 2232 of the recess portion 223 of the upper side wall 211. In the cross-sectional area changing portion 221 of FIG. 22, the upper side surface 2243 of the recess portion 224 of the lower side wall 212 is non-parallel to the upper side surface 2233 of the recess portion 223 of the upper side wall 211.

Figure 23:
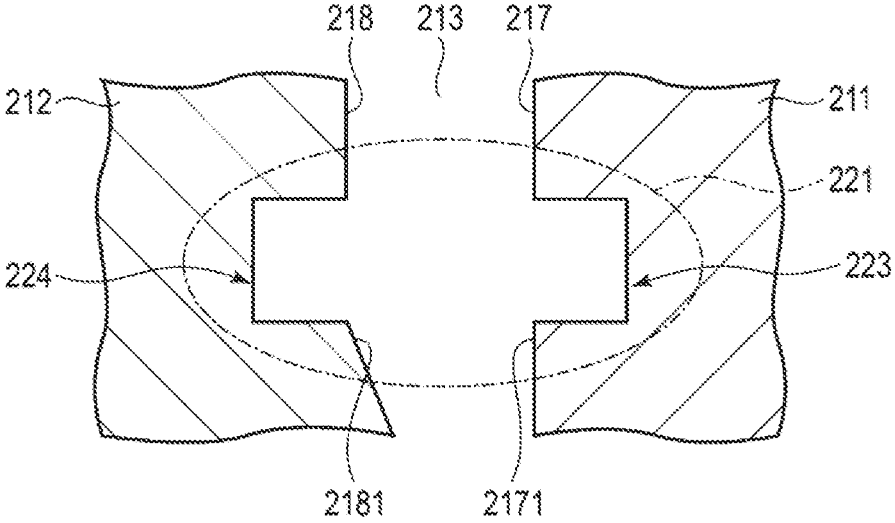
FIG. 23 is a diagram illustrating a modified example of a pair of facing surfaces that defines a gap between openings.

Similarly, in the description so far, it is assumed that the facing surface 217 of the upper side wall 211 and the facing surface 218 of the lower side wall 212 are both flat and parallel to each other. However, the shapes of the facing surfaces 217 and 218 are not limited thereto. FIG. 23 is a diagram illustrating a modified example of the pair of facing surfaces 217 and 218 that define the space 213. In the modified example, in the downward portion of the cross-sectional area changing portion 221, a partial facing surface 2181 of the facing surface 218 of the lower side wall 212 is not parallel to a partial facing surface 2171 of the facing surface 217 of the upper side wall 211. That is, the pair of facing surfaces 217 and 218 facing each other at an interval defining the space 213 of the cross-sectional area changing portion 221 have non-parallel portions. The position of the non-parallel portion is not limited to the downward portion of the cross-sectional area changing portion 221 and may be anywhere.

Figure 24:
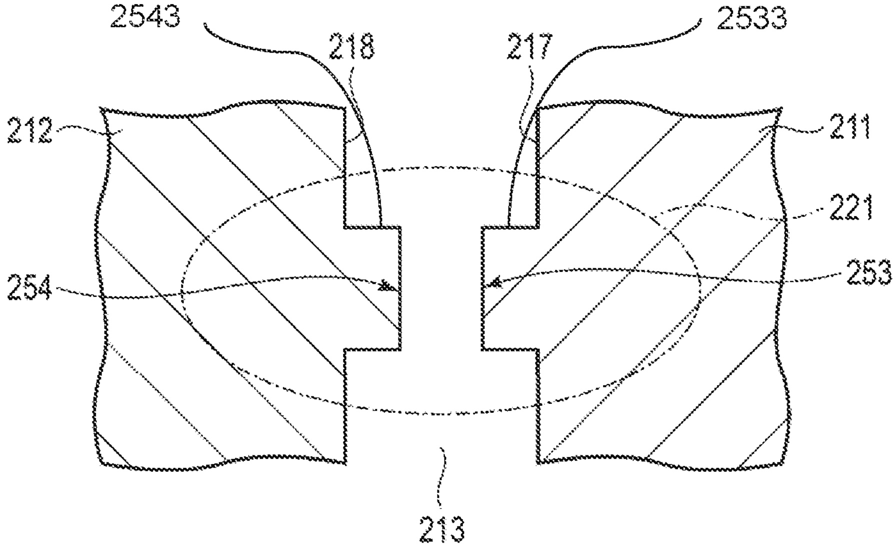
FIG. 24 is a diagram illustrating a modified example of a pair of non-flat portions of the cross-sectional area changing portion.

Similarly, in the description so far, the cross-sectional area changing portion 221 has the pair of non-flat portions, and the pair of non-flat portions are the pair of recess portions 223 and recess portions 224. However, the non-flat portion of the cross-sectional area changing portion 221 is not limited to the pair of recess portions 223 and recess portions 224. FIG. 24 is a diagram illustrating a modified example of the pair of non-flat portions of the cross-sectional area changing portion 221. The pair of non-flat portions of the cross-sectional area changing portion 221 in FIG. 24 are a protruding portion 253 formed on the facing surface 217 of the upper side wall 211 and a protruding portion 254 formed on the facing surface 218 of the lower side wall 212. In the cross-sectional area changing portion 221 of FIG. 24, a portion of the sound traveling to the cross-sectional area changing portion 221 is reflected by the upper side surfaces 2533 and 2543 of the protruding portions 253 and 254, and the sound passing through the cross-sectional area changing portion 221 is reduced. Further, the reflected sound interferes with the sound traveling to the cross-sectional area changing portion 221 and is muted.

Figure 25:
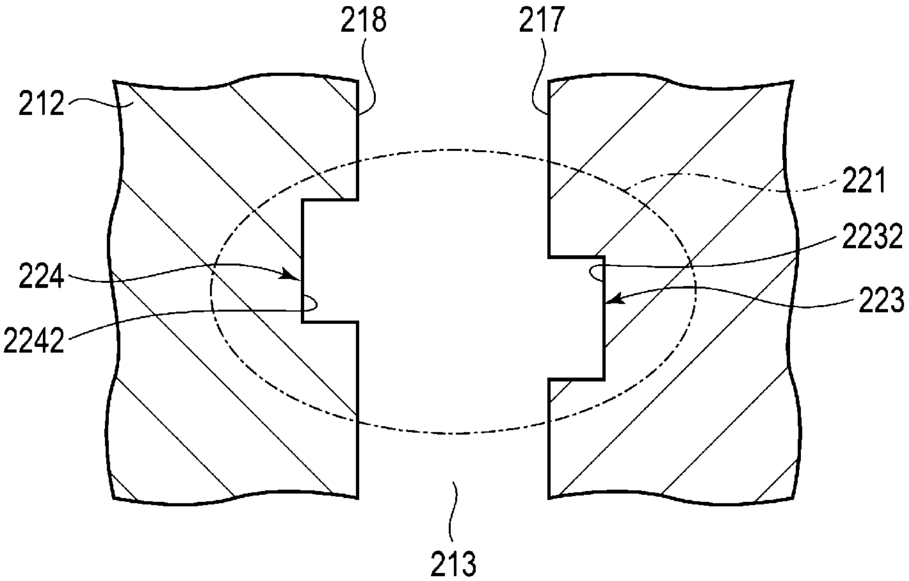
FIG. 25 is a diagram illustrating a modified example of positions of a pair of recess portions of the cross-sectional area changing portion in a vertical direction.

Similarly, in the description so far, it is assumed that the recess portion 223 of the upper side wall 211 and the recess portion 224 of the lower side wall 212 in the cross-sectional area changing portion 221 are located at the same position in the vertical direction. However, the recess portion 223 and the recess portion 224 need not be at the same position in the vertical direction. FIG. 25 is a diagram illustrating a modified example of positions of a pair of the recess portion 223 and the recess portion 224 of the cross-sectional area changing portion 221 in the vertical direction. In the cross-sectional area changing portion 221 of FIG. 25, the recess portion 223 of the upper side wall 211 and the recess portion 224 of the lower side wall 212 are located at positions shifted in the vertical direction. A portion of the bottom surface 2232 of the recess portion 223 and a portion of the bottom surface 2242 of the recess portion 224 face each other.

Figure 26:
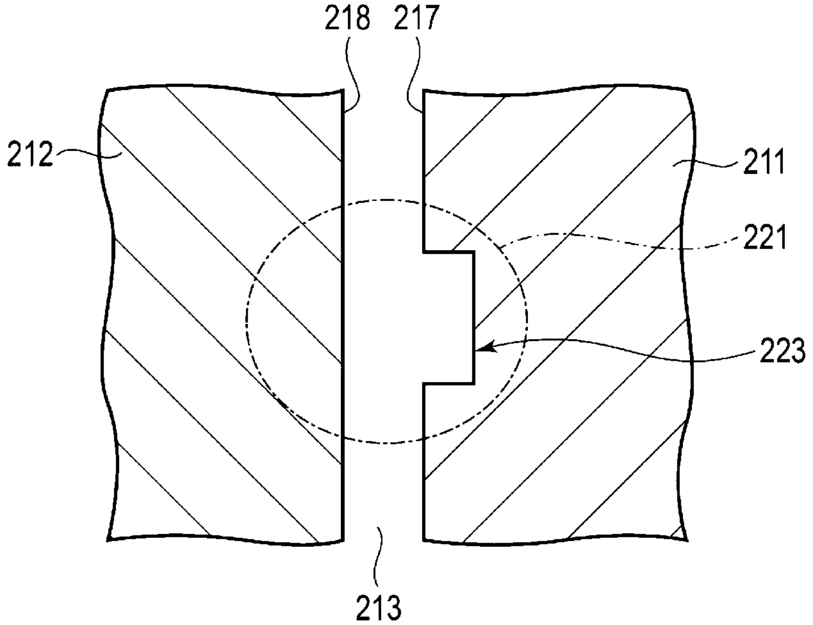
FIG. 26 is a diagram illustrating a modified example of non-flat portions with which the pair of non-flat portions of the cross-sectional area changing portion can be replaced.
Figure 27:
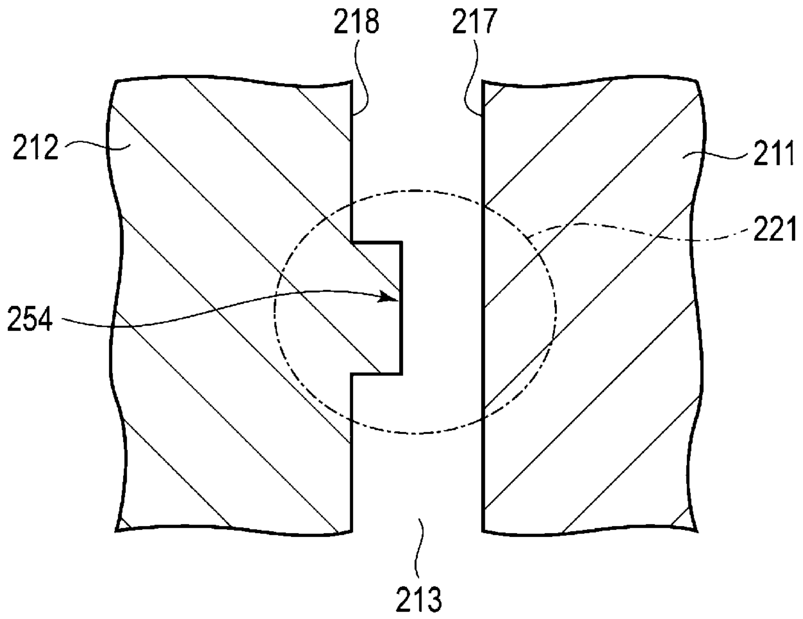
FIG. 27 is a diagram illustrating another modified example of the non-flat portions with which the pair of non-flat portions of the cross-sectional area changing portion can be replaced.

Similarly, in the description so far, it is assumed that the cross-sectional area changing portion 221 has the pair of non-flat portions. However, the cross-sectional area changing portion 221 need not have the pair of non-flat portions. FIGS. 26 and 27 are diagrams illustrating a modified example of the non-flat portion with which the pair of non-flat portions of the cross-sectional area changing portion 221 can be replaced. The cross-sectional area changing portion 221 of FIGS. 26 and 27 has only one non-flat portion instead of having the pair of non-flat portions. The cross-sectional area changing portion 221 of FIG. 26 has the recess portion 223 which is the non-flat portion formed on the facing surface 217 of the upper side wall 211. The cross-sectional area changing portion 221 of FIG. 26 has the recess portion 223 on the upper side wall 211, but may have a recess portion on the lower side wall 212 instead. The cross-sectional area changing portion 221 of FIG. 27 has the protruding portion 254 which is the non-flat portion formed on the facing surface 218 of the lower side wall 212. The cross-sectional area changing portion 221 of FIG. 27 has the protruding portion 254 on the lower side wall 212, but may have a protruding portion on the upper side wall 211 instead.

In each of the modified examples of the cross-sectional area changing portion 221 described above, since the non-flat portion is provided on at least one of the pair of facing surfaces 217 and 218 that define the space 213 of the opening 210, the function of muting the sound passing through the space 213 is provided.

Figure 28:
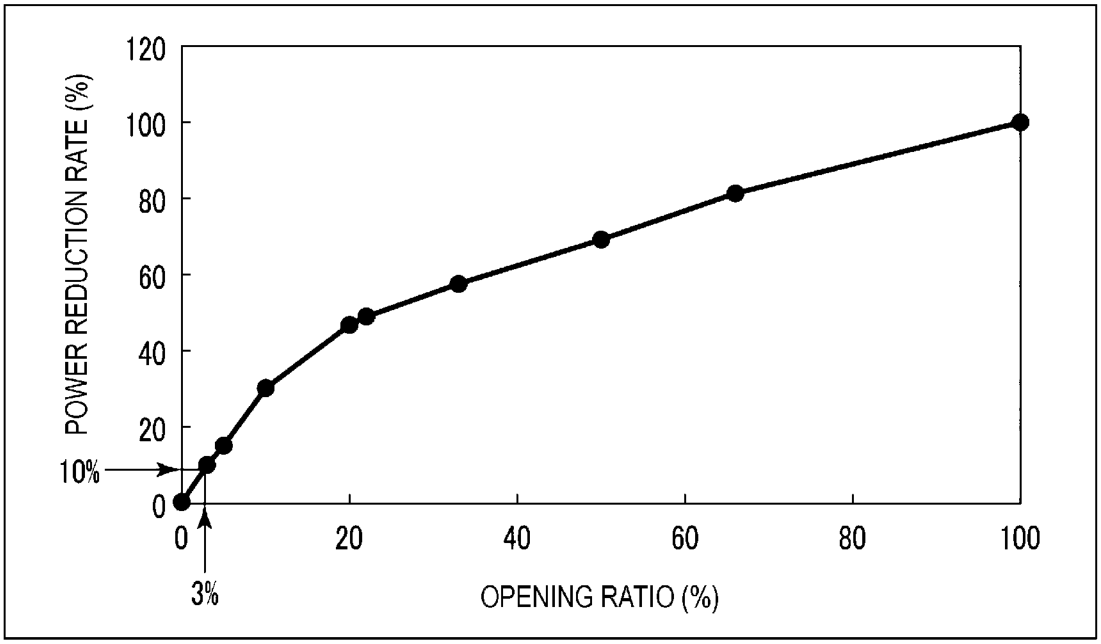
FIG. 28 is a graph of experimental results illustrating a change in a power reduction rate of sound leaking from a box with respect to a change in an opening ratio of an opening having one surface of a rectangular box.

Next, the opening ratio of the opening 210 will be described with reference to FIG. 28. An experiment is conducted to measure a difference in power of sound leaking from the inside to the outside of a rectangular box due to a difference in opening ratio of an opening if one of the six surfaces of the box has the opening. In the experiment, a speaker is installed inside the rectangular box, the opening is provided on one of the six surfaces of the box, and the power of the sound leaking through the opening is measured while changing the opening ratio of the opening. Herein, the opening ratio is the ratio of the area occupied by the opening to the area of one surface of the box having the opening. In addition, white noise is output from the speaker. FIG. 28 is a graph illustrating an experimental result illustrating the change in the power reduction rate of the sound leaking from the box with respect to the change in the opening ratio of the opening of one surface of the rectangular box based on the state where the opening ratio is 100%. Herein, the state where the opening ratio is 100% denotes that the entire one surface of the box is open.

Generally, if the power reduction rate is 10% or less, it is considered that the sound leakage is small and the muting effect is not significantly reduced. As can be seen from FIG. 28, the opening ratio corresponding to the power reduction rate of 10% is 3%. Therefore, the opening ratio of the opening 210 is preferably 3% or less.

Figure 29:
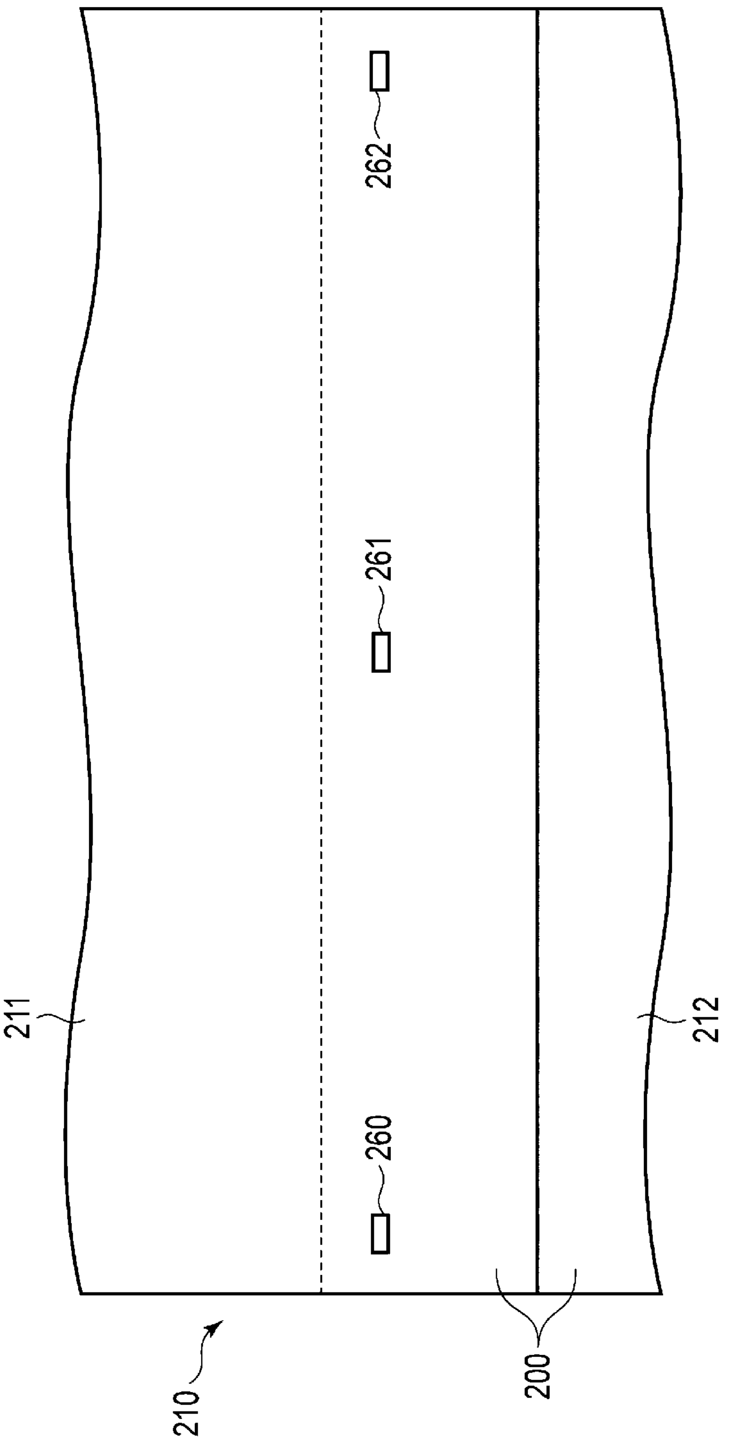
FIG. 29 is a view seen from an arrow A of FIG. 8 in a configuration example in which the opening is open to a sound path.

FIG. 29 is a diagram illustrating a configuration example in which the opening 210 has an opening in a sound path and is an arrow view seen from an arrow A illustrated in FIG. 8. As illustrated in FIG. 29, in the configuration example, the upper side wall 211 of the housing 200 of the image forming apparatus 10 has openings 260, 261, and 262 at three positions. The opening ratio of the opening 210 described above is a ratio of an area of the upper side wall 211 of the housing 200 forming the sound path to a total area of the openings 260, 261, and 262 at the three positions.

According to the embodiment described above, there is provided the image forming apparatus in which the sound leaking from the image forming apparatus is hard to hear with ears of persons around the image forming apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
- an image forming component configured to form an image on paper;
- a conveying component configured to convey the paper through the image forming component; and
- a housing that accommodates the image forming component and the conveying component,
- wherein the conveying component is arranged on one side surface side of the housing,
- the housing has an opening on a side wall on the conveying component side,
- the opening only faces downward, and
- the opening has at least one cross-sectional area changing portion that changes the cross-sectional area of an inner space in the middle of a space connecting an inside and an outside of the housing.

2. The image forming apparatus according to claim 1, wherein the cross-sectional area changing portion has non-flat portions formed on at least one of a pair of facing surfaces facing each other at an interval defining the inner space.

3. The image forming apparatus according to claim 2, wherein the cross-sectional area changing portion has a pair of the non-flat portions formed on both of the pair of facing surfaces.

4. The image forming apparatus according to claim 2, wherein a pair of the non-flat portions face each other.

5. The image forming apparatus according to claim 1, wherein the opening has a plurality of cross-sectional area changing portions that change the cross-sectional area of an inner space in the middle of a space connecting an inside and an outside of the housing.

6. The image forming apparatus according to claim 5, wherein each of the plurality of cross-sectional area changing portions has non-flat portions formed on a pair of facing surfaces facing each other at an interval defining the inner space.

7. The image forming apparatus according to claim 6, wherein a length of each of a plurality of pairs of the non-flat portions along the space is different.

8. The image forming apparatus according to claim 1, wherein
- the opening has a space connecting an inside and an outside of the housing, and
- a pair of facing surfaces facing each other at an interval defining the space have non-parallel portions.

9. The image forming apparatus according to claim 1, wherein an opening ratio of the opening is 3% or less of a surface area of the side wall on the conveying component side.

10. A noise mitigation structure for an image forming apparatus, comprising:
- a housing that accommodates an image forming component configured to form an image on paper and a conveying component configured to convey the paper through the image forming component,
- wherein the conveying component is arranged on one side surface side of the housing,
- the housing has an opening on a side wall on the conveying component side,
- the opening only faces downward, and
- the opening has at least one cross-sectional area changing portion that changes the cross-sectional area of an inner space in the middle of a space connecting an inside and an outside of the housing.

11. The noise mitigation structure according to claim 10, wherein the cross-sectional area changing portion has non-flat portions formed on at least one of a pair of facing surfaces facing each other at an interval defining the inner space.

12. The noise mitigation structure according to claim 11, wherein the cross-sectional area changing portion has a pair of the non-flat portions formed on both of the pair of facing surfaces.

13. The noise mitigation structure according to claim 11, wherein a pair of the non-flat portions face each other.

14. The noise mitigation structure according to claim 10, wherein the opening has a plurality of cross-sectional area changing portions that change the cross-sectional area of an inner space in the middle of a space connecting an inside and an outside of the housing.

15. The noise mitigation structure according to claim 14, wherein each of the plurality of cross-sectional area changing portions has non-flat portions formed on a pair of facing surfaces facing each other at an interval defining the inner space.

16. The noise mitigation structure according to claim 15, wherein a length of each of a plurality of pairs of the non-flat portions along the space is different.

17. The noise mitigation structure according to claim 10, wherein
- the opening has a space connecting an inside and an outside of the housing, and
- a pair of facing surfaces facing each other at an interval defining the space have non-parallel portions.

18. The noise mitigation structure according to claim 10, wherein an opening ratio of the opening is 3% or less of a surface area of the side wall on the conveying component side.

* * * * *